United States Patent [19]
Tzirkel-Hancock

[11] Patent Number: 5,913,188
[45] Date of Patent: Jun. 15, 1999

[54] APPARATUS AND METHOD FOR DETERMINING ARTICULATORY-ORPERATION SPEECH PARAMETERS

[75] Inventor: Eli Tzirkel-Hancock, Merrow Park, United Kingdom

[73] Assignee: Canon Kabushiki Kaisha, Tokyo, Japan

[21] Appl. No.: 08/526,386

[22] Filed: Sep. 11, 1995

[30] Foreign Application Priority Data

Sep. 26, 1994 [GB] United Kingdom .................... 9419388

[51] Int. Cl.$^6$ ....................................................... G10L 3/02
[52] U.S. Cl. ............................................ 704/223; 704/221
[58] Field of Search ........................... 395/2.1, 2.2, 2.22, 395/2.23, 2.29, 2.3, 2.33, 2.34, 2.35, 2.4, 2.43, 2.47, 2.64, 2.65

[56] References Cited

U.S. PATENT DOCUMENTS

| | | |
|---|---|---|
| 4,039,754 | 8/1977 | Lokerson ..................................... 179/1 |
| 4,058,676 | 11/1977 | Wilkes et al. ................................ 179/1 |
| 4,343,969 | 8/1982 | Kellett . |
| 4,630,305 | 12/1986 | Borth et al. ................................. 381/94 |
| 4,696,039 | 9/1987 | Doddington .............................. 381/46 |
| 4,696,040 | 9/1987 | Doddington et al. ................... 395/2.33 |
| 4,747,143 | 5/1988 | Kroeger et al. ............................ 381/47 |
| 4,780,906 | 10/1988 | Rajasekaran et al. ..................... 381/43 |
| 4,827,516 | 5/1989 | Tsukahara et al. ........................ 381/36 |
| 4,980,917 | 12/1990 | Hutchins . |
| 5,012,519 | 4/1991 | Adlersberg et al. ....................... 381/47 |
| 5,121,428 | 6/1992 | Uchiyama et al. .......................... 395/2 |
| 5,138,661 | 8/1992 | Zinser et al. ............................... 381/35 |
| 5,175,793 | 12/1992 | Sakamoto et al. . |
| 5,265,167 | 11/1993 | Akamine et al. ........................ 395/2.2 |
| 5,274,711 | 12/1993 | Rutledge et al. .......................... 381/47 |
| 5,381,512 | 1/1995 | Holton et al. ........................... 395/2.41 |
| 5,450,522 | 9/1995 | Hermansky et al. ..................... 395/2.2 |
| 5,497,447 | 3/1996 | Bahl et al. .............................. 395/2.54 |
| 5,657,426 | 8/1997 | Waters et al. . |
| 5,659,658 | 8/1997 | Vanska . |

OTHER PUBLICATIONS

"Pitch–synchronous frame–by–frame and segment based articulatory analysis by synthesis", Journal of the Acoustical Soc. of America, vol. 94, No. 5, pp. 2517–2519 and 2522–2529, by S.K. Gupta.

"High resolution pole–zero analysis of Parkinsonian speech", Feb. 1991, IEEE Transactions on Biomedical Engineering, vol. 38, No. 2, pp. 161–167.

"A linguistic feature representation of the speech waveform", Minneapolis, ICASSP–93, vol. II, pp. 483–486, Apr. 27, 1993.

*Primary Examiner*—David R. Hudspeth
*Assistant Examiner*—Michael N. Opsasnick
*Attorney, Agent, or Firm*—Fitzpatrick, Cella, Harper & Scinto

[57] ABSTRACT

In an apparatus for extracting information from an input speech signal, a preprocessor, a buffer, a segmenter, an acoustic classifier and a feature extractor are provided. The preprocessor generates formant related information for consecutive time frames of the input speech signal. This formant related information is fed into the buffer, which can store signals representative of a plurality of frames. The segmenter monitors the signals representative of the incoming frames and identifies segments in the input speech signal during which variations in the formant related information remain within prespecified limits. The acoustic classifier then determines classification information for each segment identified by the segmenter, based on acoustic classes found in training data. The feature estimator then determines, for each segment, the information required, based on the input speech signal during that segment, training data and the classification information determined by the acoustic classifier.

62 Claims, 14 Drawing Sheets

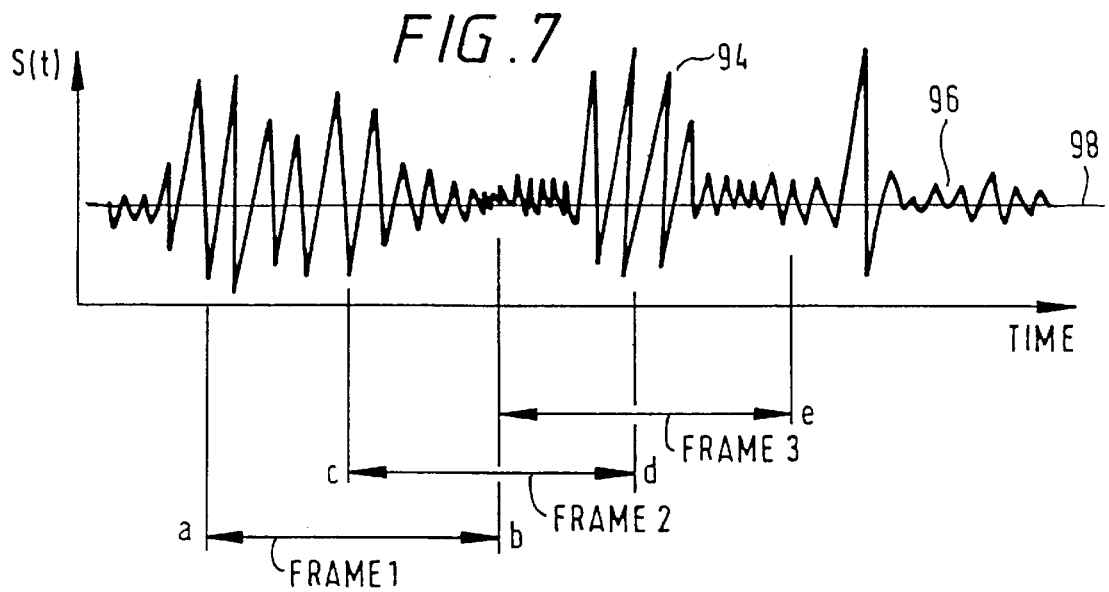
FIG. 7
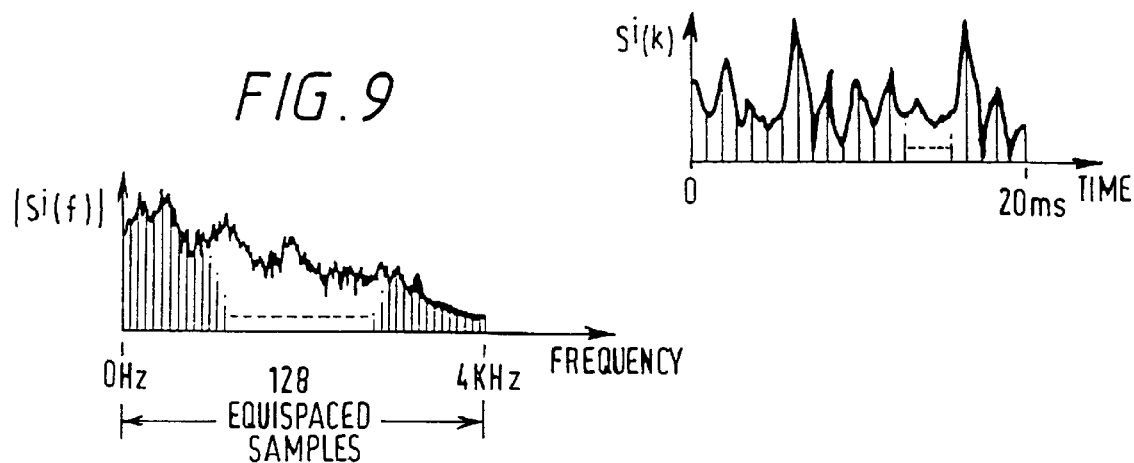
FIG. 8
FIG. 9
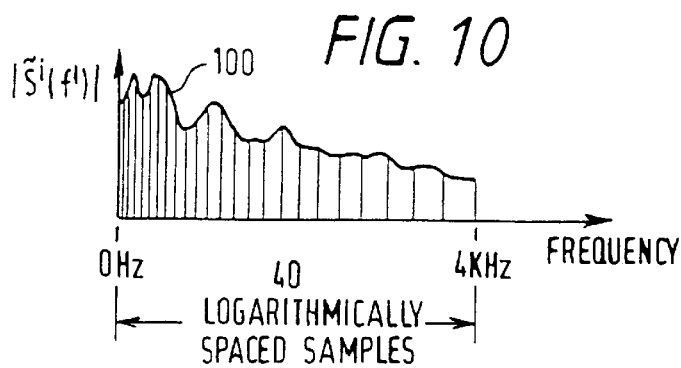
FIG. 10

FIG. 24

| FEATURE VALUE \ PHONE | VOWELS | | | | | CONSONANTS | | | | | | | | |
|---|---|---|---|---|---|---|---|---|---|---|---|---|---|---|
| | \|i\| | \|e\| | \|æ\| | \|o\| | \|u\| | \|p\| | \|b\| | \|k\| | \|f\| | \|th\| | \|m\| | \|n\| | \|l\| | \|w\| |
| CONSONTAL | − | − | − | − | − | + | + | + | + | + | + | + | + | + |
| SONORANT | + | + | + | + | + | − | − | − | − | − | + | + | + | + |
| RHOTIC | − | − | − | − | − | − | − | − | − | − | − | − | − | − |
| ROUND | − | − | − | + | + | − | − | − | − | − | − | − | − | + |
| NASAL | − | − | − | − | − | − | − | − | − | − | + | + | − | − |
| TENSE | + | + | + | + | + | + | − | − | + | + | − | − | + | − |
| VOICED | − | − | − | − | + | − | + | − | − | − | + | + | + | + |
| HIGH | + | − | − | − | + | − | − | + | − | − | − | − | − | + |
| LOW | − | − | + | − | − | − | − | − | − | − | − | − | − | − |
| BACK | − | − | − | + | + | − | − | + | − | − | − | − | − | + |

APPARATUS AND METHOD FOR DETERMINING ARTICULATORY-ORPERATION SPEECH PARAMETERS

BACKGROUND OF THE INVENTION

1. Field of the Invention

The present invention relates to a method and apparatus for extracting information from speech. The invention has particular, although not exclusive relevance to the extraction of articulatory feature information from a speaker as he/she speaks.

2. Description of the Prior Art

There are several known techniques for diagnosing speech disorders in individual speakers, most of which rely on a comparison of various articulatory features, i.e. the positions of the lips, tongue, mouth, etc, of a "normal" speaker with those of the individual being diagnosed. One technique relies on a clinician extracting from the individual's speech the phonetic content, i.e. the string of phones that make up the speech. Each phone is produced by a unique combination of simultaneously occurring distinct articulatory features, and therefore the articulatory features can be determined and compared with those of a "normal" speaker. However, there are several disadvantages of this technique.

The first disadvantage with this technique is that it is not practical to have a phone for every possible combination of articulatory feature values. Consequently, only the most frequent combination of articulatory feature values are represented by the set of phones, and so many possible articulations are not represented.

A second disadvantage of a phonetic technique is that the speech is considered as being a continuous stream of phones. However, such a concept of speech is not accurate since it assumes that all the articulatory features change together at the phone boundaries. This is not true since the articulatory features change asynchronously in continuous speech, which results in the acoustic realisation of a phone being dependent upon its neighbouring phones. This phenomenon is called co-articulation. For example for the phrase "did you" the individual phonemes making up this phrase are:

"/d ih d y uw/"

However, the phonetic realisation of the phrase given above during continuous speech, would be:

"/d ih j h uw/"

The final d in "did" is modified and the word "you" becomes converted to a word that sounds like "juh".

A third disadvantage with this technique is that a clinician has to make a phonetic transcription of the individuals speech which is (i) time consuming; (ii) costly, due to the requirement of a skilled clinician; and (iii) unreliable due to possible human error.

Another type of technique uses instruments to determine the positions of the articulatory structures during continuous speech. For example, cinefluorography which involves the photographing of x-ray images of the speaker is one such technique. In order to analyse movement of the articulatory structures, sequences of individual cinefluorographic frames are traced, and measurements are made from the tracings using radiopaque beads, skeletal structures, and/or articulators covered with radiopaque substances.

However, there are a number of disadvantages associated with the use of cinefluorographic techniques i) there is a danger of radiation exposure, therefore, the size of the speech sample must be restricted;

ii) the acquisition of data must be under supervision of a skilled radiologist which results in high cost;

iii) the body must be stabilised which might result in an unnatural body posture which may affect the articulation; and iv) variations in the x-ray data obtained from individual to individual results in reduced reliability of the data measurements.

Ultrasonic imaging is another instrumental technique that allows observation of the dynamic activity of the articulatory structures, but does not interfere with the articulatory structures' activity, nor does it expose the subject to radiation. Ultrasonic imaging uses the reflection of ultrasonic waves from the interface between two media. Since the time between the initiation of the ultrasonic pulses and the return is proportional to the distance from the transmitter to the boundary, information relating to the reflected waves may be used to produce a time-amplitude display indicative of the structure reflecting the waves. This technique, however, suffers from the problem that the observer is not exactly sure of the point on the structure that he is measuring the return from, and also the transmitter and receiver must be at 90° to the interface. Therefore, when trying to characterise speech disorders by structural anomalies, it may be particularly difficult to identify the point on the structure being monitored.

A technique for extracting articulatory information from a speech signal has been proposed in "A linguistic feature representation of the speech waveform" by Ellen Eide, J Robin Rohlicek, Herbert Gish and Sanjoy Mitter; International Conference on Acoustics, Speech and Signal Processing, April 1993, Minneapolis, USA, Vol. 2, pages 483–486. In this technique, a whole speech utterance, for example a sentence, is input into the speech analysis apparatus, the utterance then being segmented. This segmentation process uses a computationally intensive dynamic programming method that determines the most likely broad phonetic sequence within the utterance. Consequently, whilst this system allows analysis of the input speech to produce some indication of the positions of some of the articulators, delays are produced due to the necessity of inputting whole speech utterances before any analysis takes place.

U.S. Pat. No. 4,980,917 discloses an apparatus and method for determining the instantaneous values of a set of articulatory parameters. It achieves this by monitoring the incoming speech and selecting a frame of speech for further processing when the monitoring identifies a significant change in the energy of the input speech signal. The further processing includes a spectral analysis and a linear mapping function which maps the spectral coefficients from the spectral analysis into articulatory parameters. However, the system described in U.S. Pat. No. 4,980,917 does not process all the input speech, and those frames of input speech that are processed are treated as separate entities. In other words, the system does not use context information, i.e. it does not consider neighbouring frames, when it determines the articulatory parameter values.

SUMMARY OF THE INVENTION

An object of the present invention is to provide an alternative method and apparatus for determining articulatory information from the speech signal of a speaker.

According to a first aspect of the present invention there is provided an apparatus for continuously determining information representative of features of a speech production system from an input speech signal as it arrives.

According to a second aspect of the present invention there is provided an apparatus for extracting, from an input speech signal, information representative of features of the speech production system that generated the input speech signal, the apparatus comprising: memory means arranged to store preprogrammable information representative of training speech signals produced during a training session; dividing means arranged to divide the input speech signal into a succession of frames; defining means arranged to define a succession of segments by grouping consecutive frames having similar acoustic properties of interest into each segment; and extracting means arranged to extract, for each segment, said information representative of features of the speech production system in dependence upon the input speech signal within that segment and upon said preprogrammable information.

According to a third aspect of the present invention, there is provided a method for extracting, from an input speech signal, information representative of features of the speech production system that generated the input speech signal, the method comprising: the step of storing in a memory preprogrammable information representative of training speech signals produced during a training session; the step of dividing the input speech signal into a succession of frames; the step of defining a succession of segments by grouping consecutive frames having similar acoustic properties of interest into each segment; and the step of extracting, for each segment, said information representative of features of the speech production system in dependence upon the input speech signal within that segment and upon said preprogrammable information.

According to a fourth aspect of the present invention, there is provided a method of determining information representative of training data, the method comprising: the step of providing a first amount of training speech signals for which phonetic and/or acoustic boundaries are known; the step of dividing said first amount of training speech signals into a succession of frames; the step of determining, for each frame, signals representative of acoustic properties of interest of the training speech signal during that frame; the step of defining a succession of segments within the first amount of training speech signals by grouping consecutive frames during which variations in the acoustic properties of interest of the training speech signal remain within specified limits, for different specified limits; the step of comparing the segments defined in the first amount of training speech signals with phonetic and/or acoustic boundaries of the first amount of training speech signals; and the step of storing the specified limit which gives a good correlation with phonetic and/or acoustic boundaries in the first amount of training speech signals.

According to a fifth aspect of the present invention, there is provided a method of determining information representative of training speech signals, the method comprising: the step of dividing a second amount of training speech signals into a succession of frames; the step of determining signals representative of the acoustic properties of interest of the training speech signal during each frame; the step of defining a succession of segments within the second amount of training speech signals by grouping consecutive frames having similar acoustic properties of interest into each segment; the step of identifying, from signals representative of each segment defined, information grouping the segments defined in the second amount of training speech into different acoustic classes representative of acoustic characteristics of the second amount of training speech signals; and the step of storing said information grouping the segments defined in the second amount of training speech into different classes.

According to another aspect, the present invention provides an apparatus for normalising an input speech signal, the apparatus comprising dividing means arranged to divide the input speech signal into a succession of frames; level determining means arranged to determine a level of the input speech signal during each said frame; normalising means arranged to normalise the level of the speech signal in each frame; detection means arranged to detect a voiced signal in the input speech signal; control means arranged to adjust said normalising means when said detection means detects a voiced signal.

According to another aspect, the present invention provides a method for normalising an input speech signal, the method comprising the step of dividing the input speech signal into a succession of frames; the step of determining a level of the input speech signal during each said frame; the step of normalising the level of the speech signal in each frame; the step of detecting a voiced signal in the input speech signal; the step of adjusting said step of normalising when said detecting step detects a voiced signal.

BRIEF DESCRIPTION OF THE DRAWINGS

Various embodiments of the invention will now be described, by way of example only, with reference to the accompanying drawings in which:

FIG. 7 is a diagrammatical representation of the division of the input speech signal S(t) into a series of time frames;

FIG. 8 shows diagrammatically a typical speech signal for a single frame;

FIG. 9 shows diagrammatically the magnitude response of the discrete Fourier transform of the speech signal shown in FIG. 8;

FIG. 10 shows diagrammatically the averaged magnitude response output of the mel scale filter bank;

FIG. 24 shows part of a look up table used in the training session of the feature estimator;

DETAILED DESCRIPTION OF PREFERRED EMBODIMENTS

Speech Production

In order to explain the nature of human speech, it is useful to give an overview of the speech production process.

Figure 1:
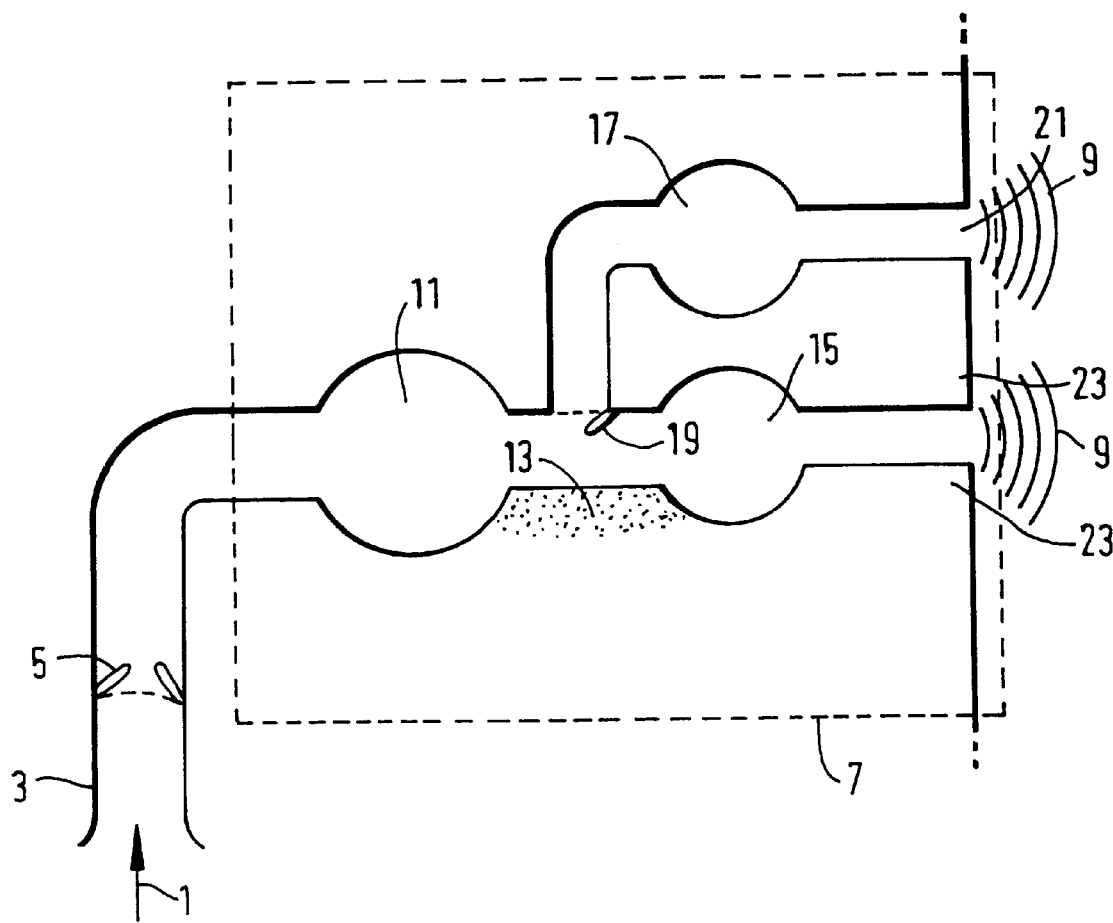
FIG. 1 shows a schematic representation of the mechanics of speech production in a human being.

FIG. 1 shows a schematic representation of the mechanics of speech production for a human being in which reference numeral 1 is an arrow which indicates air as it is expelled from the lungs, 3 represents the windpipe, 5 represents the vocal chords, 7 represents the vocal tract and 9 represents the resulting speech output from the vocal tract. Within the vocal tract 7, there are provided the pharynx cavity 11, the tongue dotted area 13, the oral cavity 15, the nasal cavity 17, the velum 19, the nostrils 21 and the lips 23.

When speaking, the lungs are filled with air by the expansion of the muscles surrounding the ribcage (not shown) as well as the lowering of the diaphragm (not shown). As the ribcage contracts air 1 is forced along the windpipe 3, past the vocal chords 5, vocal tract 7 and expelled into the atmosphere via the nostrils 21 and lips 23. However, in order to generate sound pressure, the air flow from the lungs must pass through a constriction. There are two places where a constriction can occur i) on passing the vocal chords 5; and ii) on passing through the vocal tract 7.

Taking each in turn, when the vocal chords 5 are tensed, they vibrate due to the passing air flow 1. This vibration results in the generation of a quasi periodic sound pressure, which is shaped in frequency in passing through the pharynx cavity 11, the oral cavity 15 and the nasal cavity 17, the shaping experienced being dependent upon the position of the various articulators.

Alternatively, when the vocal chords are relaxed, in order to produce the sound pressure, the air must pass through a constriction in the vocal tract, as for example during articulation of an "s" sound. Alternatively the airflow can build up pressure behind a point of total closure within the vocal tract which when released, generates a sound pressure, as for example the "puh" sound at the beginning of the word "pin".

Figure 2:
FIG. 2 shows schematically a model of the speech production process consisting of an excitation signal and a filter.

It is possible to model the speech production process in terms of an excitation signal and a filter. FIG. 2 shows such a model in which E(t) is the excitation signal, 31 is the vocal tract filter V(t) and S(t) is the resulting speech.

Figure 3A:
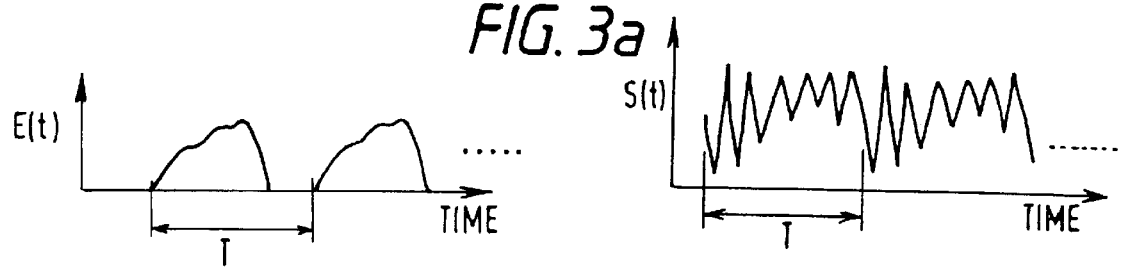
FIG. 3a shows the excitation signal for a voiced sound and the resulting output sound after filtration by the vocal tract.

FIG. 3a shows an example where the excitation signal E(t) represents a quasi periodic sound pressure 33 having period T, generated when the vocal chords are tensed and vibrating. With such an excitation signal coming from the vocal chords 5, the vocal tract filter V(t) will constitute the whole of the vocal tract 7. FIG. 3a also shows the resulting output "voiced" sound S(t) after filtering by the vocal tract filter V(t).

Figure 3B:
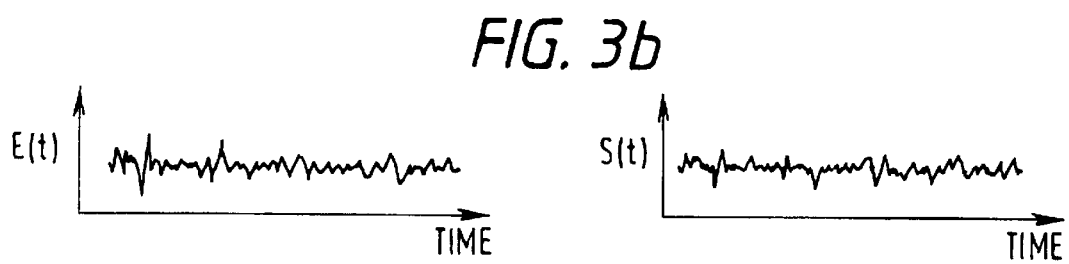
FIG. 3b shows the excitation signal for an unvoiced sound and the resulting output sound after filtration by the vocal tract.

FIG. 3b shows an example of an excitation signal E(t) generated when the vocal chords 5 are relaxed but when there is a constriction at some point in the vocal tract 7, as for example during articulation of an "s" sound. In this case, the vocal tract filter V(t) will constitute those parts of the vocal tract 7 beyond the constriction. FIG. 3b also shows the resulting output sound S(t) which shows the low power nature of a fricative sound.

Figure 4:
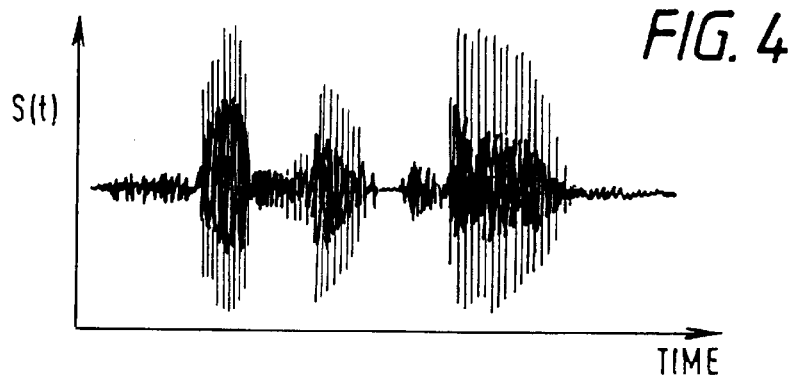
FIG. 4 shows a typical speech signal waveform.

FIG. 4 shows a typical speech waveform that is generated as the excitation signal and vocal tract changes during continuous speech. The filtration effect of the vocal tract filter V(t) is such that the frequencies within the excitation signal E(t) corresponding to the resonant frequencies or so called "formants" of the vocal tract are emphasised. However as a speaker speaks, the shape of the vocal tract 7 changes and so the formants change.

Therefore, if it is possible to extract and to track formant related information continuously during continuous speech, it will be possible to estimate the shape of the vocal tract 7 and hence estimate the position/value of the articulatory features of interest, since there is a correlation between the formant related information and the position/value of the articulatory features of interest.

Some examples of the articulatory features which may be considered and their possible values will now be given, though these are given by way of example only, and should not be construed as limiting in any way.

Nasal/Non Nasal:

Nasal sounds are produced with the velum 19 lowered allowing sounds to emanate from the nose. For non nasal sounds the velum 19 is raised, blocking the nasal tract. In English, the phones /n/ and /m/ are nasals during which sound emanates from the nose only. Sound from both the nose and the mouth are however common.

High/Low/Centre:

This refers to the vertical position of the tongue body. For example for the vowel in the word "bit" (American pronunciation) the tongue body is high, in "bet" the tongue body is centre and in "bat" the tongue body is low.

Back/Front/Mid:

This refers to the horizontal position of the tongue body. For example for the vowel in the word "book"

(American pronunciation), the tongue body is at the back of the mouth, in "but" the tongue body is midway and in "bit" the tongue body is at the front of the mouth.

Coronal/Non-coronal:

Coronal refers to the tip of the tongue being raised from its natural position. For example, the English phones /l/ /r/ /n/ /t/ /d/ /s/ /th/ are coronal sounds.

Round/Not Round:

This refers to the shape of the lips. For example at the beginning of the word "word" the lips are rounded.

Obstruent/Sonorant:

This is a broad class feature corresponding to all phones produced with a radical constriction in air flow, whatever it may be. For example all fricatives (/f/ /s/ /sh/ . . .) and plosives (/t/ /d/ . . .) are obstruents while vowels, glides (/y/ /w/) and nasals (/n/ /m/ . . .) are sonorants.

Consonantal/Non Consonantal:

Consonantal refers to the presence of an obstruction in the mid line region of the vocal tract. For English phones, this is similar to an obstruent feature, except for nasals which are consonantal.

Voiced/Unvoiced:

Voiced sounds are produced when the vocal chords vibrate. Unvoiced sounds (whispered sounds) are produced with the glotal opening wide enough to prevent vibration. All vowels in English are voiced. Some consonants are voiced (e.g. /b/ /v/ . . . ) and some are not (e.g. /sh/ /s/ /t/ . . . ).

Closure/Non Closure:

This refers to the situation where there is no radiation at all, as in silence, or before the release of a plosive.

Release/Non Release:

This refers to the detection of the release and aspiration part of a plosive.

Tense/Lax:

Tense sounds are produced with considerable muscular effort in the root of the tongue. Both vowels and consonants may be tense. For example the vowel in "bit" (American pronunciation) is tense, whereas the vowel in "but" is lax.

Rhotic/Non Rhotic:

Sound produced with the tip of the tongue curled backwards are rhotic, for example the American "r".

Overview of Speech Analysis Apparatus

Figure 5:
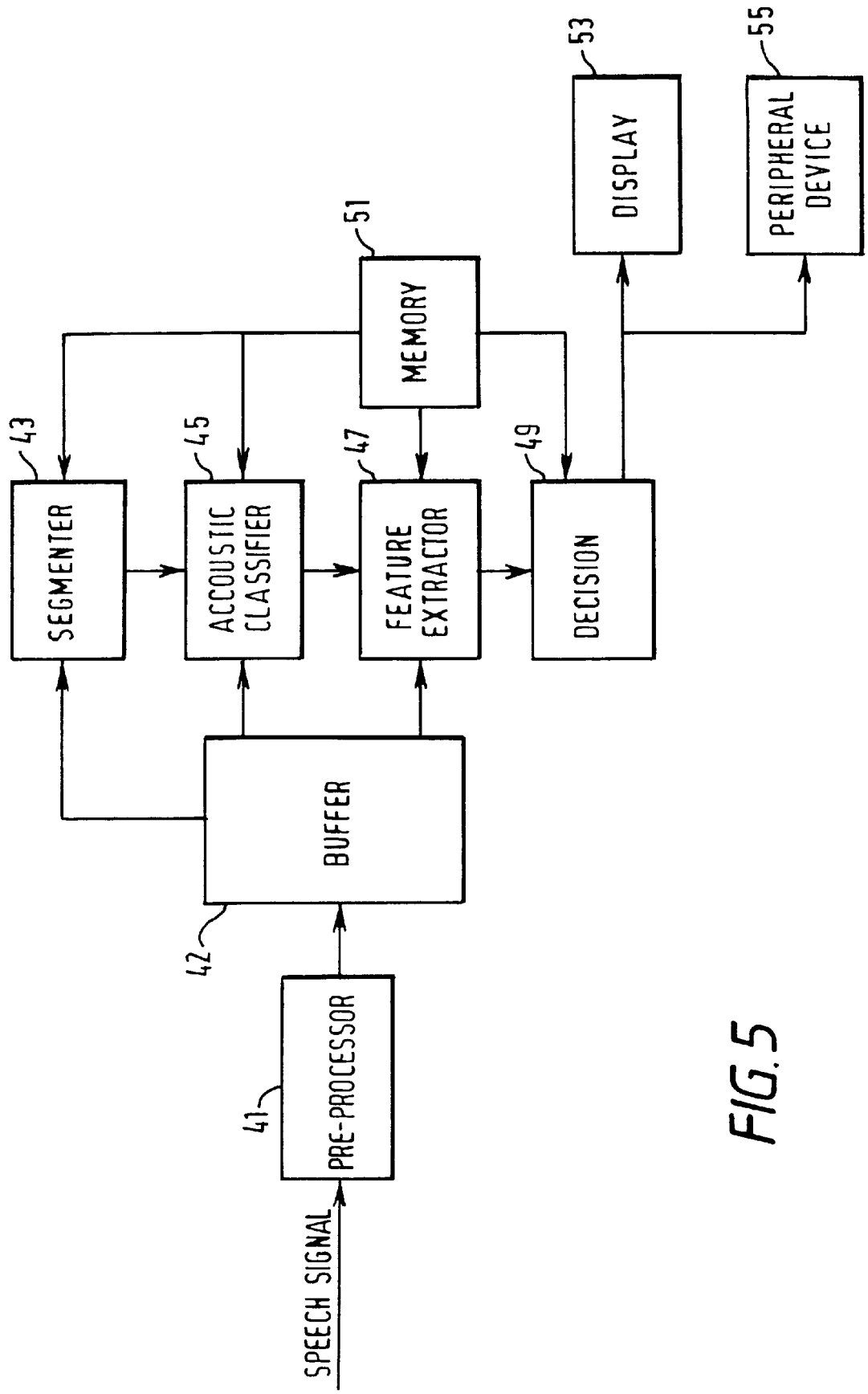
FIG. 5 is a schematic overview of the apparatus according to a first embodiment of the present invention for extracting articulatory feature information from an input speech signal.

FIG. 5 shows an overview of an apparatus, according to a first embodiment of the present invention, used to extract the articulatory information from the speech signal and to produce a representation of the probable positions of the articulators based on the input speech signal. In this embodiment, the system is designed to output the result incrementally, i.e. to generate the output as soon as the input is received with a small delay.

In FIG. 5, 41 is a preprocessor for extracting formant related information from the input speech signal, 42 is a circular buffer for storing signals from preprocessor 41; 43 is a segmenter that determines segment boundaries in the speech signals within circular buffer 42; 45 is an acoustic classifier for classifying each segment; 47 is a feature estimator for estimating the probability that the articulatory features have some value, e.g. open or closed; 49 represents a decision making block which estimates the values of the articulatory features; 51 is a memory which stores information needed for the segmenter 43, the acoustic classifier 45, the feature estimator 47 and the decision making block 49; 53 is a display for displaying, for example, the mid-sagittal plane of the human vocal system showing the articulators as the speaker speaks; and 55 represents a peripheral device, for example a printer or hard disc for storing the information which has been extracted.

In operation, preprocessor 41 divides the input speech signal as it arrives into frames and determines, for each frame, signals representative of formant information of the input speech signal within that frame. For convenience, the signals that represent each frame of input speech will be referred to as "vectors". The remainder of the apparatus is used to estimate, for each vector, the articulatory feature values of interest, which requires some knowledge of the acoustic context of the vector. In this embodiment, only the local context of the vector is used, i.e. the input speech signal for neighbouring frames. This context information is determined by the operation of buffer 42, segmenter 43 and acoustic classifier 45 as follows: as each vector is determined it is fed into circular buffer 42 that buffers a small number of such vectors. As each new vector enters buffer 42, segmenter 43 decides whether the vector belongs to the current segment or whether the vector should start a new segment based on information derived by the apparatus during a first training session. If segmenter 43 decides that a new segment should be started then the buffer address of the first and last vector in the current segment are supplied to acoustic classifier 45.

Once a segment, comprising a number of vectors, has been identified it is classified into one of a number of acoustic classes by acoustic classifier 45, each acoustic class being defined beforehand from training data from a second training session.

The probable value of the articulatory features of interest are then calculated for each vector in the current segment, in feature extractor 47 and decision block 49 using the acoustic classification information obtained by acoustic classifier 45 and using models obtained beforehand during a third training session. This information may then be printed out directly for analysis or may be used to generate a corresponding image of the articulatory structures of the speaker as he/she speaks on display 53.

Those skilled in the art of speech analysis will realise that preprocessor 41 does not generate any vectors while the feature values are being estimated for a segment. Accordingly, a further buffer (not shown) is required to buffer the incoming speech to account for this.

A more detailed explanation will now be given of the apparatus described above.

Preprocessor

The preprocessor will now be described with the aid of FIGS. 6 to 13.

The objects of the preprocessor are to extract the information required from the speech and to reduce the amount of data that has to be processed. There are many known methods of preprocessing speech in the field of speech analysis and the following method is given by way of example only and should not be construed as limiting in any way. In the particular application being described, formant related information is of interest. Consequently, preprocessor 41 is designed to extract the formant related information from the incoming speech signal. However, for other applications other information might be of interest and preprocessor 41 would be modified accordingly.

Figure 6:
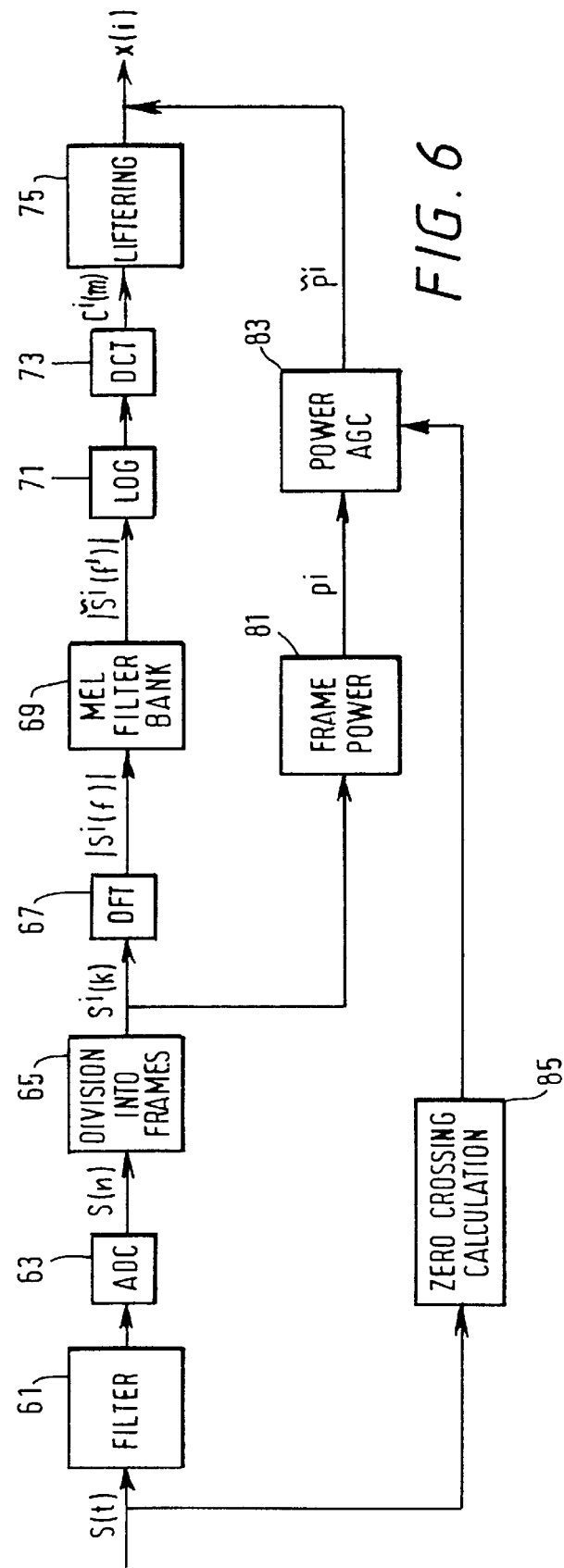
FIG. 6 shows a block diagram illustrating the preprocessing steps that are performed on the input speech signal.

FIG. 6 shows a block diagram of the preprocessing that is performed on the input speech signal.

Input speech S(t) from a microphone or the like (not shown) is supplied to filter block 61, which removes frequencies within the input speech signal that contain no meaningful information. In speech signals, most of the meaningful information is contained below 4 KHz. Therefore, filter block 61 removes all frequencies above 4 KHz.

The filtered speech signal is then converted into digital samples via the analogue-to-digital converter (ADC) 63. To adhere to the Nyquist sampling criterion, ADC 63 samples the filtered signal at a rate of 8000 times per second.

As described above, during continuous speech the formant related information changes continuously, the rate of change being directly related to the rate of movement of the speech articulators which is limited by physiological constraints. Therefore, in order to track the changing formant frequencies, the speech signal must be analysed over short time periods or frames, this method being known in the art of speech analysis as a "short time" analysis of speech. There are two considerations that have to be addressed when performing a short time analysis: (i) what rate should the time frames be extracted from the speech signal, and (ii) how large a time frame should be used.

The first consideration depends on the rate of movement of the speech articulators i.e. the frames should be sufficiently close so that important events are not missed and so that there is reasonable continuity. In this embodiment, a frame is extracted once every 10 milliseconds. The second consideration is determined by a compromise—the time frame should be short enough so that the speech signal's properties during the frame are constant, but the frame should be long enough to give sufficient frequency detail so that the formants can be distinguished. In the present embodiment, the frames are 20 milliseconds in length which, with the above sampling rate, corresponds to 160 samples.

If these frames are generated by extracting the frames directly from the speech samples, considerable frequency distortion results. Therefore, to reduce such distortions, a smoothed window function should be used. There are many such windows available including Hamming, Hanning, Blackman, Bartlett and Kaiser all of which will be known to those skilled in the art of speech analysis. In the present embodiment, a Hamming window is used, this being represented by the following equation:

$$W(n) = 0.54 - 0.46 \cos[2\pi n/(N_s-1)] \quad (1)$$

where $N_s$ is the number of samples in the window, i.e. 160 samples.

FIG. 7 shows in more detail the short time analysis operation that is carried out in the present embodiment. The speech signal in frame 1, i.e. between time instant "a" and time instant "b", is multiplied by the window function given in equation (1). Further, due to the choice of the frame rate and the frame length, the next frame, frame 2, starts midway between frame 1 at time instant "c" etc.

Once a frame of input speech signal has been extracted, the magnitude of the discrete Fourier transform (DFT) of the frame is calculated in block 67, i.e. $|S^i(f)|$ where f is the discrete frequency variable. Only the magnitude information is required, since many aspects of this preprocessor are designed to simulate the operation of the human auditory system, which is relatively insensitive to the phase of the input speech signal. FIG. 8 shows a typical speech signal for a single frame $S^i(k)$ comprising 160 samples, i.e. k=0,1, . . . 159. To enable an efficient fast Fourier transform (FFT) algorithm to be used in the calculation of the DFT, the number of samples within the frame $S^i(k)$ needs to be increased to a power of 2. One method of achieving this is by adding 96 zero's at the end of the 160 samples to give 256 samples. This technique is known as "padding with zeros" and is well known in the art of speech analysis, and will not be described further.

In computing the DFT of $S^i(k)$, only the first 128 samples of the spectrum need to be computed, since speech is a real signal and so the second 128 samples will be a mirror image of the first 128 samples. FIG. 9 shows the first 128 samples of the magnitude of the DFT $|S^i(f)|$ of the speech signal in frame $S^i(k)$ shown in FIG. 8, the last sample of which occurs at a frequency of half the sampling frequency, i.e. 4 KHz.

As mentioned earlier, the purpose of preprocessor 41 is to reduce the data rate and to emphasise particular components of the input speech signal. The data rate has been reduced slightly by the DFT, since there are now only 128 samples per frame. One method of reducing the data rate further is to split the spectrum into a number of equal frequency bands and to average the samples within each band, i.e. pass the samples shown in FIG. 9 through a filter bank.

Studies on the human auditory system have shown that the ear frequency resolution decreases with increasing frequency. Therefore, a logarithmically spaced filter bank, i.e. one in which there are more frequency bands in the low frequency region compared to the high frequency region, is preferable to a linearly spaced filter bank since a logarithmically spaced filter bank retains more perceptually meaningful information.

In the present embodiment, a mel spaced filter bank 69 having forty bands is used. The mel scale is well known in the art of speech analysis, and is a logarithmic scale that attempts to map the perceived frequency of a tone onto a linear scale. FIG. 10 shows the output $|\tilde{S}^i(f')|$ of the mel spaced filter bank 69, when the samples shown in FIG. 9 are passed through the bank 69. The resulting envelope 100 of the magnitude spectrum is considerably smoother due to the averaging effect of the filter bank 69, although less smoother at the lower frequencies due to the logarithmic spacing of the filter bank.

The formant related information is then extracted from the speech using blocks 71, 73 and 75 of FIG. 6, by a process which will now be explained.

As discussed above with reference to FIG. 2, the speech signal S(t) can be viewed as being generated by the excitation of a vocal tract filter V(t) by an excitation signal E(t). Consequently, the magnitude of the frequency spectrum $|S(f)|$ of the speech signal is given by the multiplication of the magnitude of the frequency spectrum $|E(f)|$ of the excitation signal with the magnitude of the spectrum $|V(f)|$ of the vocal tract filter, i.e.

$$|S(f)| = |E(f)| \cdot |V(f)| \quad (2)$$

One method, known as the cepstral method, of extracting the vocal tract information from the input speech will now be described. This method involves separating the vocal tract filter magnitude response $|V(f)|$ from the excitation magnitude response $|E(f)|$ by taking the logarithm of the speech magnitude response $|S(f)|$, which results in the excitation and vocal tract filter characteristics becoming additive, i.e.

$$\log|S(f)| = \log|E(f)| + \log|V(f)| \quad (3)$$

Figure 11:
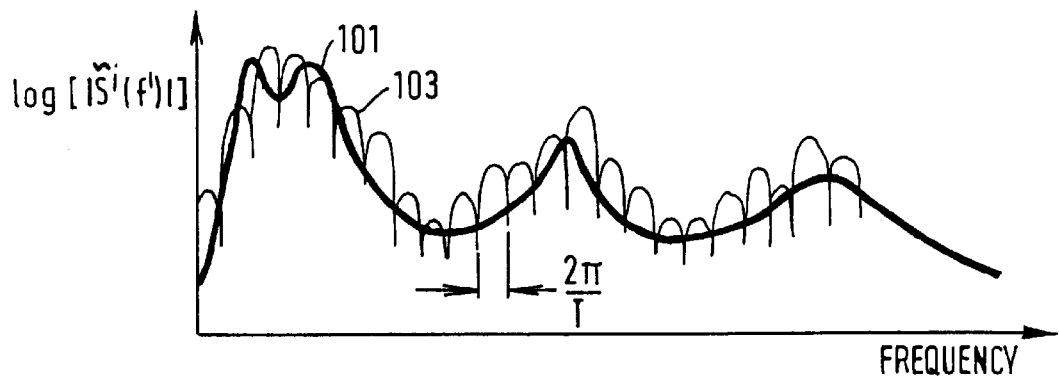
FIG. 11 shows diagrammatically the log magnitude spectrum of the output from the mel filter bank.

FIG. 11 shows the envelope of the logged output from the mel filter bank 69, i.e. $\log|\tilde{S}^i(f')|$, which shows graphically the additive nature of two components 101 and 103. Component 101 is representative of the vocal tract characteristics, i.e. $\log|V(f)|$, and component 103 is representative of the excitation characteristics, i.e. $\log|E(f)|$. The peaks in component 101 occur at the formant frequencies of the vocal tract and the equally spaced peaks in component 103 occur at the harmonic frequencies of the pitch of the speaker.

The vocal tract characteristics 101 can be extracted from the excitation characteristics 103, by performing a discrete cosine transform (DCT) on the samples output from block 71, and then filtering the result.

Figure 12:
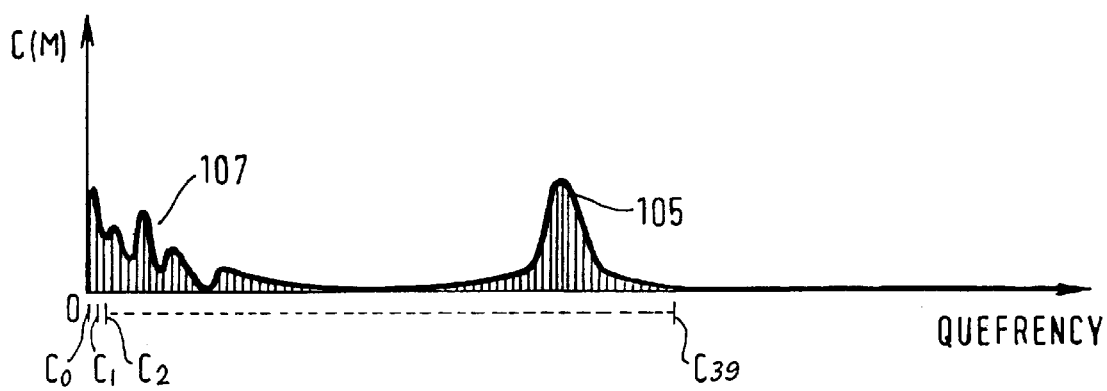
FIG. 12 shows diagrammatically the cepstrum of the logged magnitude spectrum shown in FIG. 11.

FIG. 12 shows the output of the DCT block 73, which is known as the cepstrum $C^i(m)$. The independent variable (x-axis of FIG. 12) of the cepstrum has dimensions of time and is given the name "quefrency". The strongly periodic component 103 shown in FIG. 11 becomes a peak in the cepstrum at a location equivalent to the pitch period T of the speaker. The slowly varying component 101 shown in FIG. 11, becomes a number of small peaks near the origin of the cepstrum, the position and amplitude of which are dependent on the formants.

As the vocal tract characteristics and the excitation characteristics of speech appear in separate parts of the quefrency scale, they can be separated from one another by a filtering process, or, in cepstral terminology by a so called "liftering" process. The cepstrum $C^i(m)$ shown in FIG. 12 is made up of a set of discrete cepstral coefficients ($C_0$, $C_1$, ... $C_{39}$), and therefore the liftering could be achieved by means of a simple rectangular window. However, in order to de-emphasise parts of the spectrum that are considered to be less reliable, a more gradual windowing function is preferred. In the present embodiment, the following window function is used in liftering block 75:

$$W_{lift}(m) = 1 + \frac{N_C}{2} \sin \frac{\pi m}{N_C} \quad (4)$$

where $N_c$ is the number of cepstral coefficients output per frame from the liftering block 75, which in the present embodiment is 12.

In addition to the twelve cepstral coefficients mentioned above, the power of the speech signal within each frame, i.e. the "frame power" is also calculated. This is an important feature since it can be used, among other things, to indicate whether or not the input speech signal during the frame corresponds to a voiced speech signal. The frame power is calculated in block 81 using a conventional method well known in the art of speech analysis.

To achieve independence of variable recording conditions, variable loudness etc, a power automatic gain controller (AGC) 83 is provided. However, during normal speech there are relatively long periods of silence or background noise during which the AGC's characteristics should not change. Unfortunately, unvoiced sounds and background noise are often relatively similar, and therefore to be sure that speech is present a voiced sound must be detected. A crude method of detecting voiced sounds is to monitor the rate at which the input speech signal crosses a "zero level".

Turning again to FIG. 7, region 94 indicates a voiced component of the speech signal, region 96 indicates either an unvoiced region of speech or background noise and line 98 represents the "zero level" of the speech signal. During the voiced region 94, the rate at which the input signal crosses the zero level decreases compared to the rate at which the input signal crosses the zero level for the unvoiced or background noise region 96. Therefore, if the rate at which the input signal crosses the zero level drops below a given threshold, then it is likely that the input signal is a voiced speech component. Consequently, there is speech present at the input and so the gain of the power AGC 83 is allowed to adjust.

Figure 13:
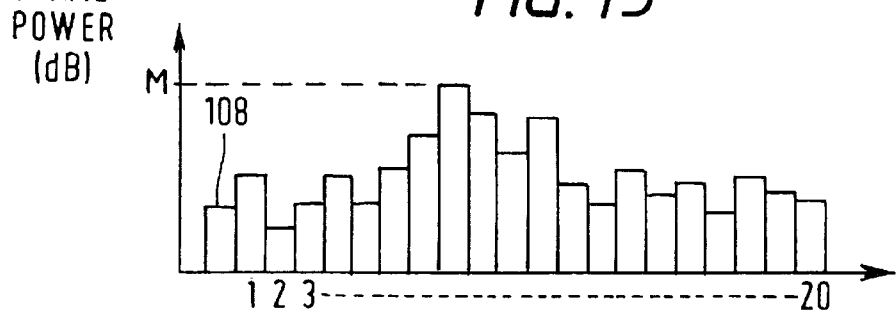
FIG. 13 shows a histogram of the frame power for the current frame and the twenty previous frames of the input speech signal.

The operation of the power AGC 83 will now be explained with the aid of FIG. 13 in which the frame power 108 for the current frame and for the twenty frames before the current frame are shown. These twenty values are stored and updated per frame. On passing through the AGC 83, the power level (dB) of the current frame is adjusted by subtracting the gain of the AGC 83 from the power in the current frame, i.e.

$$\tilde{p}_{(dB)}^i = p_{(dB)}^i - g_{(dB)}^i \quad (5)$$

where $\tilde{p}^i_{(dB)}$ is the power of the current frame after normalisation, $p^i_{(dB)}$ is the power of the current frame before normalisation and $g^i_{(db)}$ is the gain of the AGC 83 for the current frame.

In order to track changing power levels in the incoming speech, the gain $g^i$ of the AGC 83 is adjusted, when the zero crossing detector detects a voiced signal in the speech, by using the following equation:

$$g_{(dB)}^i = A g_{(dB)}^{i-1} + (1-A) M_{(dB)} \quad (6)$$

where $g^{i-1}_{(dB)}$ is the gain for the previous frame, A is a constant between zero and 1, preferably between 0.9 and 1. M is the maximum frame power (dB) of the twenty frames preceding the current frame, as shown in FIG. 13, and is calculated by the AGC 83 from the stored values.

On the other hand, if the zero crossing detector 85 indicates that the input signal corresponding to the present frame is probably either an unvoiced sound or background noise, then the gain of the automatic gain controller 83 is not adjusted and remains the same as the gain applied to the previous frame. In this way, the gain varies slowly and approaches the maximum of the previous twenty frames.

Whereas in the present embodiment, the power of the input speech signal during each frame is determined, other values indicative of the input speech signal during each frame could be used. For example, a measure of the average magnitude of the input speech signal during a frame could be determined and could be normalised in a similar manner to the method described above for normalising the power.

Although twenty frames have been used in the present embodiment, this is by way of an example and should not be construed as limiting in any way.

In summary, the output of preprocessor 41 is a set of coefficients—twelve cepstral coefficients and one power coefficient that represent the input speech signal in the corresponding time frame. For convenience, the coefficients that represent frame i will be referred to as vector X(i), and the coefficients that represent the subsequent frame will be referred to as vector X(i+1) etc.

Buffer

The output of preprocessor 41 for frame i (X(i)) is applied to buffer 42 of FIG. 5. In the present embodiment, a circular buffer is employed capable of storing 20 vectors output from preprocessor 41. The buffer size is determined by the maximum segment length, which will become apparent from the description of the segmenter 43 given below.

In operation, a modulo 20 counter (not shown) addresses the incoming vectors into buffer 42, such that the vector received corresponding to frame i is over written by the vector received 20 frames later, i.e. the vector received corresponding to frame i+20.

Segmenter

The purpose of the segmenter 43 is to identify segments in the input speech signal, during which variations in the acoustic properties of interest of the input speech signal are small. Any method of segmentation that achieves this can be used in the present invention, although one method, which works incrementally, will now be explained.

As each vector enters buffer 42, segmenter 43 decides whether the vector belongs to the current segment or whether the vector should start a new segment. This decision is made based upon the variation between the vector just received and the other vectors within the current segment.

Figure 14:
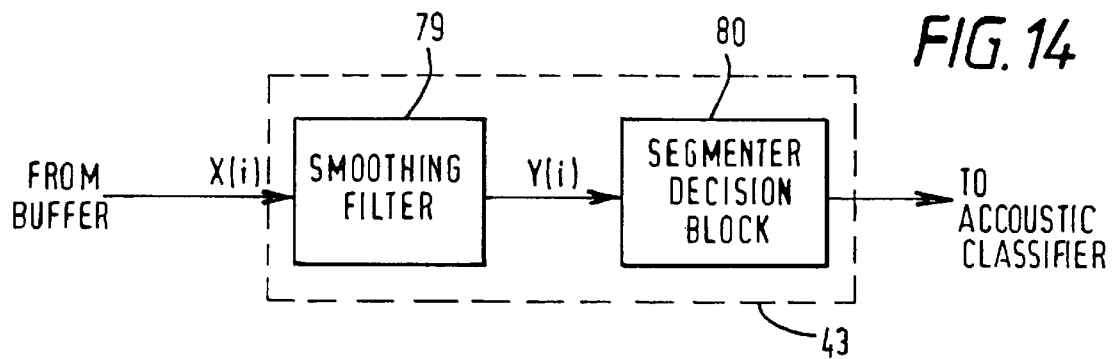
FIG. 14 shows a block diagram that illustrates the operation of the segmenter in the first embodiment.

FIG. 14 shows in more detail the components of the segmenter 43, in which 79 is a filter for smoothing the vectors and 80 is the segmenter decision block. The purpose and operation of these components will now be explained further with reference to FIGS. 15 and 16.

Figure 15A:
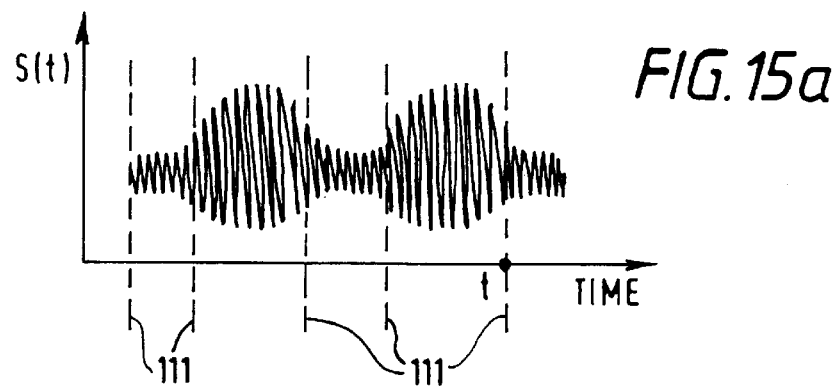
FIG. 15a shows diagrammatically part of a typical speech signal that has been split into acoustically similar segments.
Figure 15B:
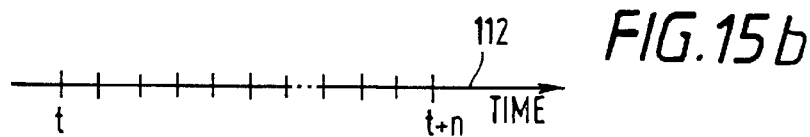
FIG. 15b shows diagrammatically the time instants when the segmenter decision block receives a vector from the smoothing filter.

FIG. 15a shows part of a typical input speech signal S(t), in which the vertical-lines 111 represent points in the speech signal where the acoustic content changes substantially i.e. points where the segmenter 43 would be expected to segment the incoming speech. FIG. 15b shows a time line 112 with distinct time instants (from time t and ending at time t+n) when segmenter decision block 80 receives a vector from the smoothing filter 79. The smoothed vector received at time t corresponds to the start of the last segment shown in FIG. 15a, and the smoothed vector received at time t+n corresponds to the most recent vector received from the smoothing filter 79.

In the present embodiment, smoothing filter 79 is provided to reduce the possibility that segmenter decision block 80 segments the incoming speech due to noise, rather than due to an actual change in the acoustic context. However, the smoothing filter 79 is not essential to the operation of the segmenter 43. The filtering operation that is used in the present embodiment is given by the following equation:

$$\begin{bmatrix} \hat{c}_0 \\ \hat{c}_1 \\ \vdots \\ \hat{c}_{12} \\ \hat{P} \end{bmatrix}_t = \gamma \begin{bmatrix} \hat{c}_0 \\ \hat{c}_1 \\ \vdots \\ \hat{c}_{12} \\ \hat{P} \end{bmatrix}_{t-1} + (1-\gamma) \begin{bmatrix} c_0 \\ c_1 \\ \vdots \\ c_{12} \\ \tilde{P} \end{bmatrix}_t \quad (7)$$

OR $Y(t) = \gamma Y(t-1) + (1-\gamma) X(t)$ where Y(t) represents the output of smoothing filter 79 for the frame at time t, Y(t−1) represents the output of smoothing filter 79 for the frame preceding the frame at time t, X(t) represents the input to smoothing filter 79 at time t (which is the vector received into buffer 42 at time t) and γ is the smoothing filter constant, the calculation of which will be explained below.

Upon receipt of the vector at time t+n from the smoothing filter 79, the segmenter decision block 80 decides whether or not including that vector in the current segment would introduce too much distortion. To do this, segmenter decision block 80 subtracts the distortion [d(t,t+n−1)+d(t+n,t+n)] which would result if a new segment was started with the vector received at time t+n from the distortion d(t,t+n) which would result if the vector received at time t+n was added to the current segment, i.e.

$$d(t,t+n)-[d(t,t+n-1)+d(t+n,t+n)] \quad (8)$$

and compares the result with a threshold Th. The distortion which would result if a new segment was started with the vector received at time t+n comprises two distortions— distortion d(t,t+n−1) and distortion d(t+n,t+n). Distortion d(t,t+n−1) represents the distortion in the old segment ending at time t+n−1, and distortion d(t+n,t+n) represents the distortion in the new segment starting at time t+n.

In the present embodiment, a Euclidean distance equation is used as the basis for the distortion function, i.e.

$$d(t_1, t_2) = \sum_{i=t_1}^{t_2} \|Y(i) - \overline{Y}(t_1, t_2)\|^2 \quad (9)$$

where Y(i) represents the $i^{th}$ vector output from the smoothing filter 79 in the segment starting at time $t_1$ and ending at time $t_2$ and $\overline{Y}(t_1,t_2)$ represents the average of all the vectors output from the smoothing filter 79 in the segment starting at time $t_1$ and ending at time $t_2$.

Therefore, by inserting the corresponding distortion functions into equation (8), the following expression is derived:

$$\frac{n}{n+1} \|\overline{Y}(t, t+n-1) - Y(t+n)\|^2 \quad (10)$$

and used to determine whether or not the current frame belongs to the current segment.

Figure 16:
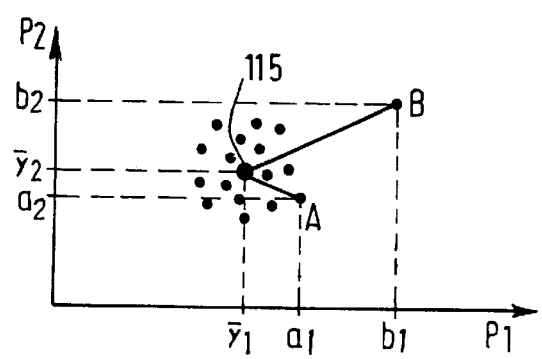
FIG. 16 is a two dimensional plot of smoothed vectors within a segment.

In order to illustrate the operation of the segmenter decision block 80 further, it is useful to restrict the number of components of the vectors to two, i.e. P1 and P2, so that the vectors output from the smoothing filter 79 can be represented by points in a two dimensional space. For each smoothed vector received by segmenter decision block 80 from time t to time t+n−1 there is a point in FIG. 16, and point 115 represents the average of those points. If point $A(a_1,a_2)$ in FIG. 16 represents the smoothed vector received by segmenter decision block 80 at time t+n, then provided the distance between point $A(a_1,a_2)$ and the average point $115(\overline{Y}_1,\overline{Y}_2)$ is below the threshold, then the vector received by buffer 42 at time t+n will be accepted as belonging to the current segment, i.e.

$$\frac{n}{n+1}\left[(\overline{Y}_1 - a_1)^2 + (\overline{Y}_2 - a_2)^2\right] < Th \quad (11)$$

Subsequently, if at time t+n+1 point $B(b_1,b_2)$ is received by segmenter decision block 80 and the distance between the new average (to take into account point A) and point $B(b_1,b_2)$ is greater than the threshold Th, then segmenter decision block 80 decides to start a new segment with the vector received at time t+n+1, and sends the buffer address of the first and last vector in the current segment to acoustic classifier 45.

It should be noted that because of the n/(n+1) factor in equation (10), segmenter 43 is biased to determine longer rather than shorter segments. Further, since acoustic classifier 45 and feature estimator 47 can only operate once a segment has been identified in the incoming speech, there is a variable time delay dependent upon the size of the segment. In order to prevent this delay from becoming too long, in the present embodiment each segment is limited to a maximum of twenty vectors. Therefore, the maximum delay caused by segmenter 43 is 0.2 seconds.

It remains to determine what values to use for the threshold Th and the smoothing filter constant γ. The value of Th used is a question of design choice. If the threshold Th is too large, then segmenter 43 might miss an important acoustic landmark in the input speech signal representative of a significant change in some of the articulatory features. On the other hand, if the threshold Th is too small then segmenter 43 will be sensitive to noise and will produce spurious boundaries.

In the present embodiment, threshold Th and filter constant γ are calculated in the following manner during the first training session, using speech signals with known phonetic and/or acoustic boundaries. The preprocessor 41 and segmenter 43 perform segmentation on the known speech signals for various values of γ and Th. The results of the segmentation are then compared with the phonetic and/or acoustic boundaries of the known speech signals, and the value of γ and Th that provide good correlation with the given boundaries are the values used in the working system.

Acoustic Classifier

Figure 17:
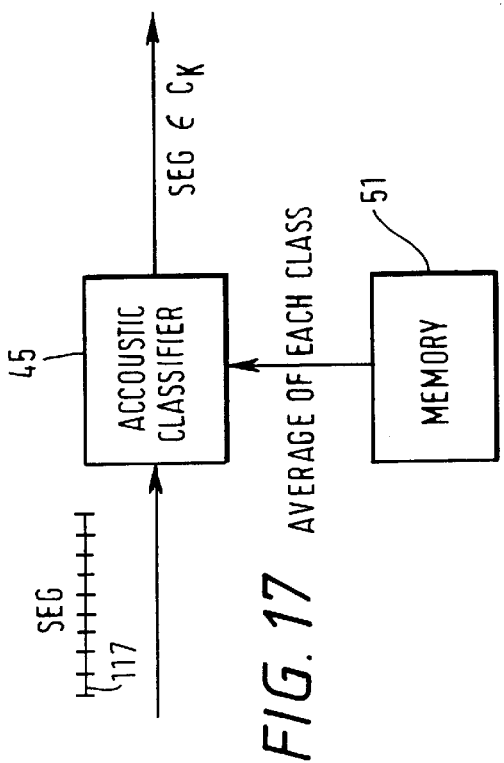
FIG. 17 illustrates diagrammatically the operation of the acoustic classifier in the first embodiment.

FIG. 17 shows schematically the function of acoustic classifier 45. Once segmenter 43 has identified a segment 117, comprising a number of vectors, the most likely acoustic class to which segment 117 belongs is determined in acoustic classifier 45, i.e. acoustic classifier 45 makes a hard decision as to which class each segment belongs. The different acoustic classes to which a segment may belong, are determined from structure found in training data obtained during the second training session.

Figure 18:
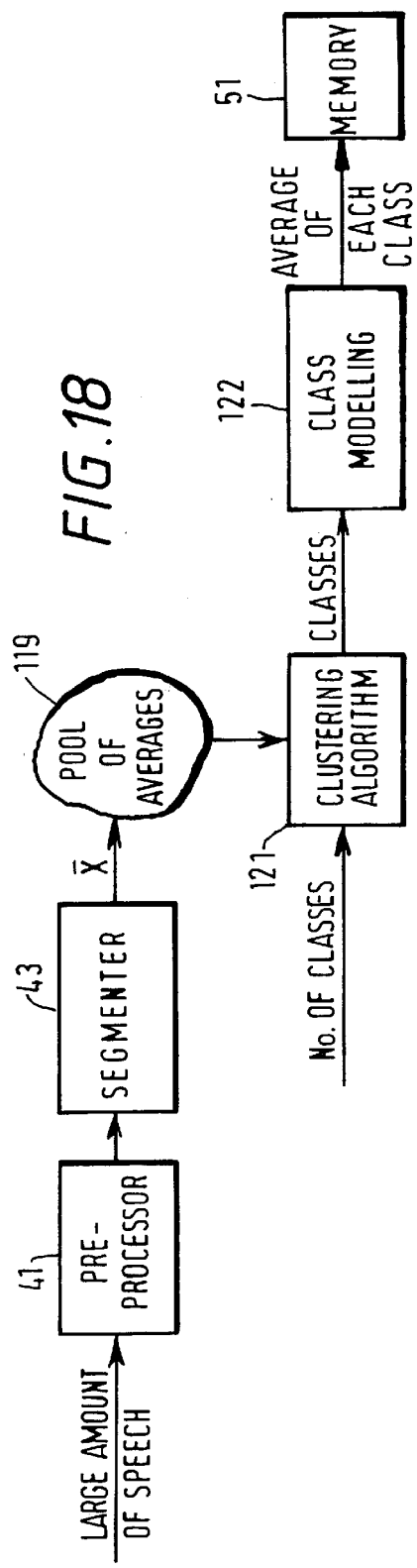
FIG. 18 illustrates diagrammatically the method used to train the acoustic classifier.

FIG. 18 shows the procedure of the second training session, during which a large amount of unknown training speech is processed by preprocessor 41 and segmenter 43 in a similar manner to that described above. During the second training session, however, segmenter 43 is arranged to determine and to output the average $\overline{X}_{seg}$ of each segment found. After a large amount of training speech has been processed, a pool 119 of segment averages will have been created. To make the system speaker independent when in operation, the training speech used should be composed of speech samples from many different speakers.

The next stage in the training session is to identify structure in the training data, i.e. to group segment averages in pool 119 such that optimum boundaries between the groups or classes are identified. This is achieved by using a clustering algorithm on pool 119 to determine optimum class boundaries that divide the pool into the required number of classes. The clustering algorithm used in the present embodiment is a K-means clustering algorithm which is an unsupervised clustering algorithm well known in the art of speech processing, although other clustering algorithms could be used. In the present embodiment, 32 classes are specified for the clustering algorithm.

Once the class boundaries are established by the clustering algorithm, a class model is determined in class modelling block 122 and stored in memory 51 for subsequent use in acoustic classifier 45 when the system is in operation. In the present embodiment, the model identified is the class average vector $\overline{C}$.

Figure 19:
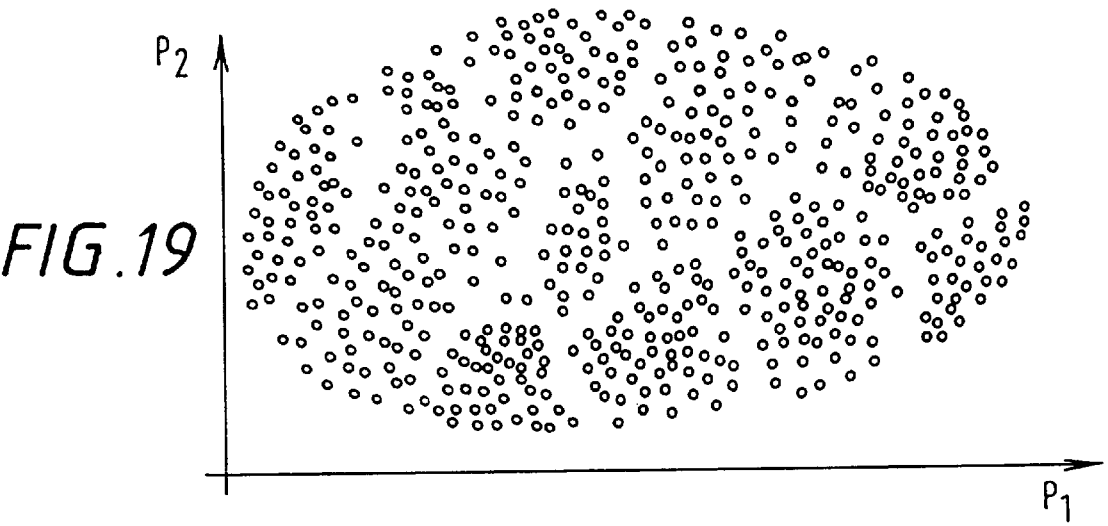
FIG. 19 illustrates a two dimensional pool of training vectors generated in the method of FIG. 18.
Figure 20:
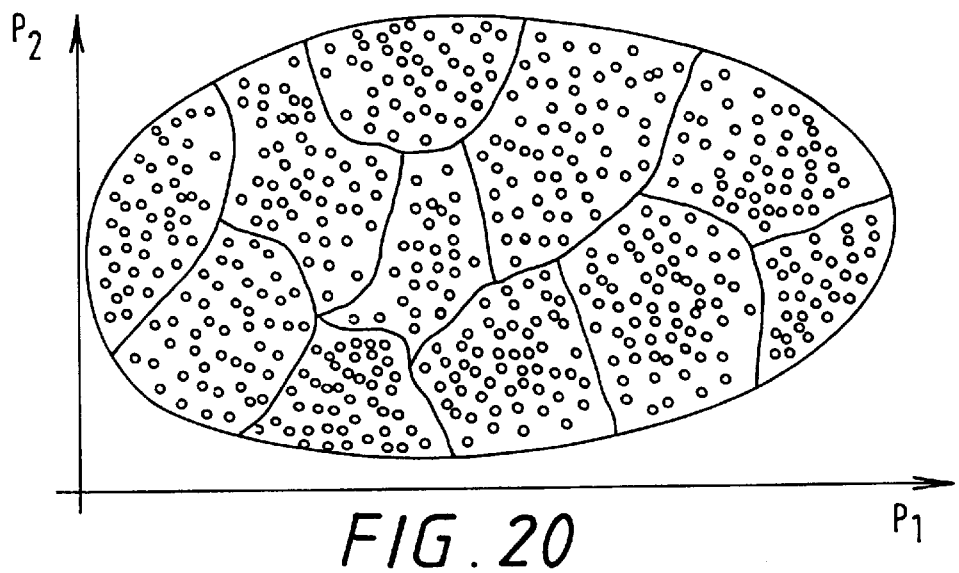
FIG. 20 is the same pool of training vectors shown in FIG. 19 after a clustering algorithm has been performed thereon.

To illustrate further the process of the clustering algorithm, FIG. 19 shows a two dimensional plot of a pool 119 of segment average vectors. A clustering algorithm is then performed on pool 119 to find the optimum boundaries that will generate the required number of classes. FIG. 20 shows the boundaries that were found after the clustering algorithm is complete when the number of classes specified was 11. Once the boundaries have been determined, it is a simple matter to calculate an average vector for each class and to store these in memory 51 for use in acoustic classifier 45 when the system is in operation.

When the system is in operation, once segmenter 43 has identified a segment 117, acoustic classifier 45 identifies the class to which segment 117 most likely belongs. In other words, acoustic classifier 45 determines the most likely acoustic context of the frames in segment 117. In the present embodiment, this is determined by comparing the average vector ($\overline{X}_{seg}$) of segment 117 with the average vector ($\overline{C}_j$) of each acoustic class, and whichever one is closest to the segment average is taken to be the acoustic class to which segment 117 belongs, i.e. acoustic classifier 45 calculates:

$$\operatorname*{Min}_{j} \|\overline{X}_{seg} - \overline{C}_j\|^2 \tag{12}$$

This method requires the calculation of the segment average $\overline{X}_{seg}$ of segment 117, which may be achieved by directly calculating it from the vectors in buffer 42, or alternatively, it may be calculated from the smoothed average $\overline{Y}$ calculated in segmenter 43.

Once the acoustic class to which segment 117 most likely belongs has been determined, this information and the segment boundary information determined by segmenter 43 is passed to the feature estimator 47.

Feature Estimator

Figure 21:
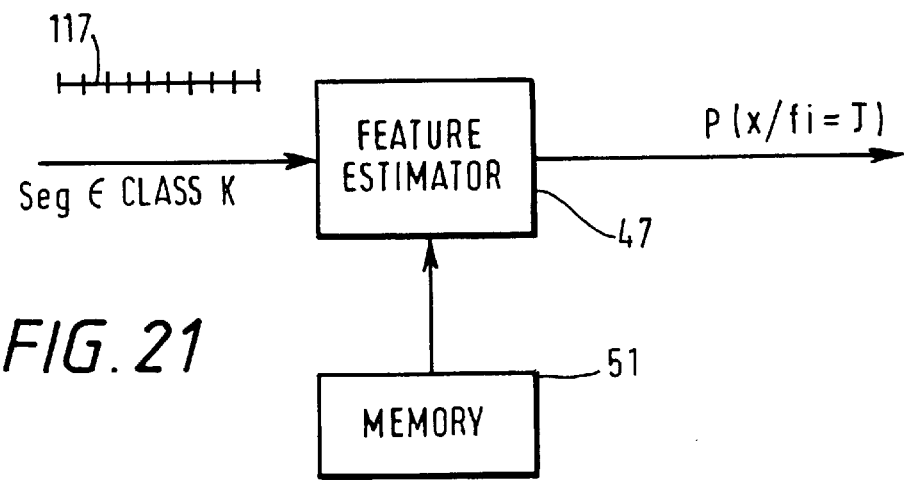
FIG. 21 schematically illustrates the operation of the feature estimator in the first embodiment.

FIG. 21 shows in more detail the inputs and outputs of feature estimator 47. Once a segment 117 has been identified in buffer 42 and once acoustic classifier 45 has identified the class to which segment 117 most likely belongs, feature estimator 47 determines, for each vector X within segment 117, what the probability is of receiving such a vector X assuming that a specific feature had a specific value. This is calculated for all features and for all values of each feature, e.g. the feature estimator 47 calculates the probability of receiving such a vector X assuming that the lips were round, assuming that the lips were non-round, assuming that the tongue was raised, assuming that the tongue was lowered etc.

Figure 22:
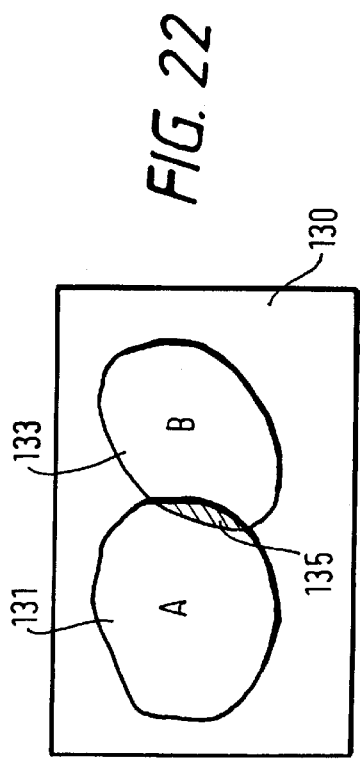
FIG. 22 is a Venn diagram illustrating the possible occurrence of an event A and an event B.

To understand how the probability of receiving such a vector X assuming that a feature has a particular value is calculated, it is important to understand the concept of conditional probability. FIG. 22 shows an illustration of two events A and B. Area 131 represents the probability of event A occurring, area 133 represents the probability of event B occurring and area 135 represents the probability of event A and B occurring together. Conditional probability is the probability of one event occurring assuming that the other event already occurred. Therefore, if event B has occurred, i.e. start in area 133, then the probability of event A occurring is given by the probability of event A and event B occurring together, i.e. area 135, weighed by the probability of event B occurring i.e. weighed by the probability of starting in area 133. In equation form this is expressed as follows:

$$P(A/B) = \frac{P(A;B)}{P(B)} \tag{13}$$

which can be rearranged to give:

$$P(A;B) = P(A/B)P(B) \tag{14}$$

This analysis can be expanded for three events to give:

$$P(A;B;C) = P(A/BC)P(B/C)P(C) \tag{15}$$

Therefore, assuming that the lips were rounded, then the probability of receiving such a vector X and that vector X is in acoustic context $C_k$, i.e. $P(X;S \in C_k/l=r)$ is given by:

$$P(X;S \in C_k/l=r) = \frac{P(X;S \in C_k;l=r)}{P(l=r)} \tag{16}$$

where $P(X;S \in C_k;l=r)$ is the probability of receiving such a vector X and that vector X is in acoustic context $C_k$ and the lips are round, and P(l=r) is the probability that the lips are round. Further, the probability of receiving such a vector X assuming that the lips were round, i.e. P(X/l=r), is found by summing equation (16) over the 32 possible acoustic contexts, i.e.

$$P(X/l=r) = \sum_{k=1}^{32} \frac{P(X; S \in C_k; l=r)}{P(l=r)} \qquad (17)$$

The right hand side of this equation can be expanded using the relationship given above in equation (15) to give:

$$P(X/l=r) = \qquad (18)$$

$$\frac{1}{P(l=r)} \sum_{k=1}^{32} P(X/l=r; S \in C_k) P(l=r/S \in C_k) P(S \in C_k)$$

where $P(x/l=r;S \in C_k)$ represents the probability of receiving such a vector X at the input assuming that the lips were round and given that vector X is in acoustic context $C_k$; $P(l=r/S \in C_k)$ represents the probability that the lips are round given the acoustic context $C_k$; and $P(S \in C_k)$ represents the probability of being in acoustic context $C_k$.

However, in the present embodiment to save computational time, it was assumed in acoustic classifier 45 that the segment belongs to one acoustic class with probability one, i.e. $P(S \in C_k)=1$ for one value of k and zero for the rest. Therefore, equation (18) can be simplified to give:

$$P(X/l=r) = \frac{P(X/l=r; S \in C_k) P(l=r/S \in C_k)}{P(l=r)} \qquad (19)$$

The probability P(l=r) that the lips are round is determined in advance from the third training session. The probability that the lips are round given an acoustic class, for each acoustic class is also determined in advance from the third training session. Therefore, when the acoustic classifier 45 identifies the acoustic class for the current segment, the corresponding probability $P(l=r/S \in C_k)$ is retrieved from memory 51. All that remains is to calculate $P(x/l=r;S \in C_k)$ which is estimated from a corresponding model in memory 51, which model is determined in advance from training data obtained during the third training session. The procedure of the third training session will now be explained with reference to FIGS. 23 to 30.

Figure 23:
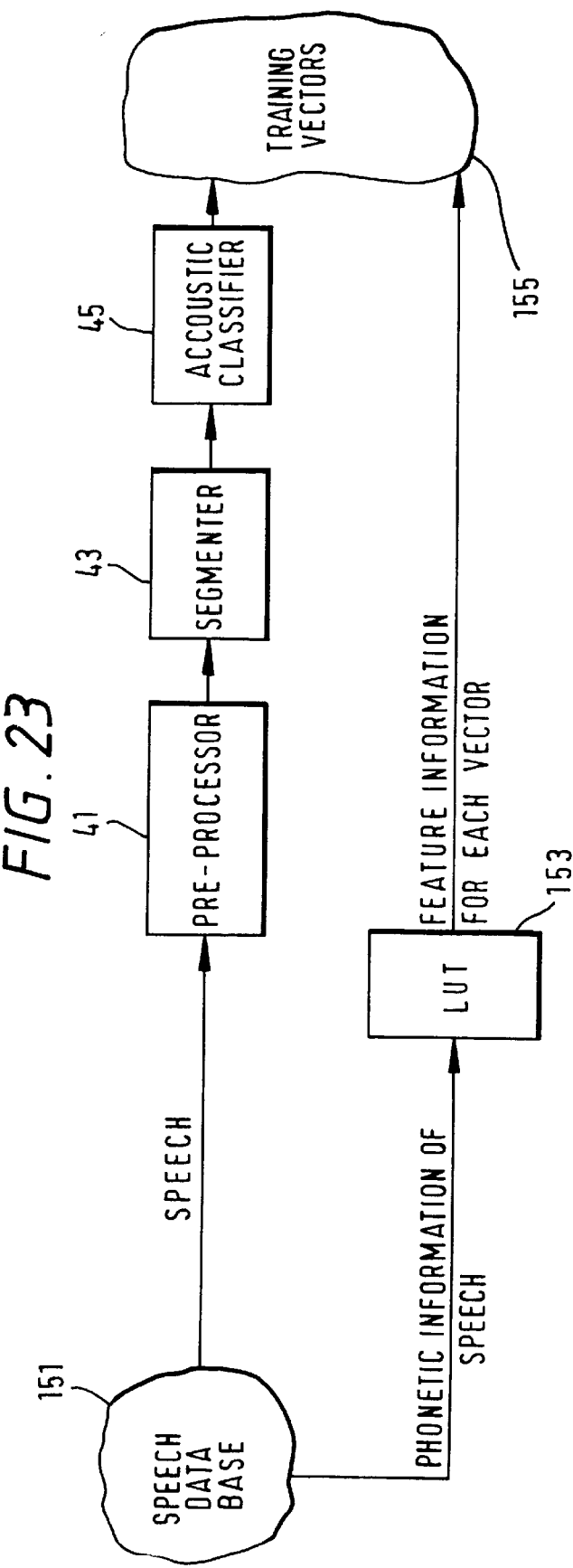
FIG. 23 shows a block diagram outlining the training procedure of the feature estimator.

FIG. 23 shows the procedure of the third training session, during which known speech samples from a database 151 are processed by preprocessor 41, segmenter 43 and acoustic classifier 45 in a manner similar to that described above. During the third training session, however, the training vectors produced by preprocessor 41 are not overwritten in a buffer memory, but are stored for subsequent analysis. Furthermore, acoustic classifier 45 is arranged to tag each vector in a segment with the classification information associated with that segment, i.e. each vector is tagged with its acoustic context information. To determine the models that relate the articulatory features of interest to the acoustic properties of interest of the speech signal for each acoustic class, the values of the articulatory features of interest must be known for the input speech signal corresponding to each training vector. Therefore, for each vector generated and stored, the acoustic context is known as well as the values of the articulatory features of interest. For example, for one such training vector it is known that it is in acoustic context $C_6$ and it is known that the corresponding speech signal was voiced, sonorant and was articulated with rounded lips and with the tongue in a high back position.

Databases are available that contain a phonetic transcription of a large number of speech samples. One such database is the Timit database which contains samples of about 3600 English language sentences and their phonetic transcription (for more information on the Timit database, see "Speech database development, design and analysis of the acoustic phonetic corpus", Proc. DARPA speech recognition workshop, report No. SAIC 86/1546 pp 100–108). To convert the phonetic information associated with the speech samples into the feature information required for determining the models just described, look up table (LUT) 153 is provided that maps the phonetic information of the speech samples into the feature information of interest.

FIG. 24 shows part of such a look up table. Along the left hand side of the table are some of the feature values of interest, and along the top are some English language phones. A plus sign in the table indicates the presence of the feature value in the phone and a minus sign in the table indicates the absence of the feature value in the phone. For example, the phone /e/ is sonorant, tense and voiced; the phone /w/ is consonantal, sonorant, voiced and is articulated with rounded lips and with the tongue body in a high back position, etc. The actual table used will depend on the features of interest and on the phones present in the database, and can be derived from the literature on linguistics or by observing which features of interest are present in each phone.

Once the speech samples have been processed, there will be a large collection 155 of sets of cepstrum and power information (i.e. training vectors) for which the acoustic context and the values of the features are known. From this collection 155 of training vectors, the probability P(l=r) that the lips are round can be calculated by dividing the number of training vectors for which the lips are round by the total number of training vectors. This probability is constant for each feature value of interest and is stored in memory 51 for subsequent use when the system is in operation.

The probability that the lips are round given an acoustic context can also be calculated from collection 155 of training vectors, by dividing the total number of training vectors for which the lips are round in that acoustic context by the total number of training vectors in that acoustic context. This probability is constant for each feature value in each acoustic context, and is stored in memory 51 for subsequent use when the system is in operation.

Figure 25:
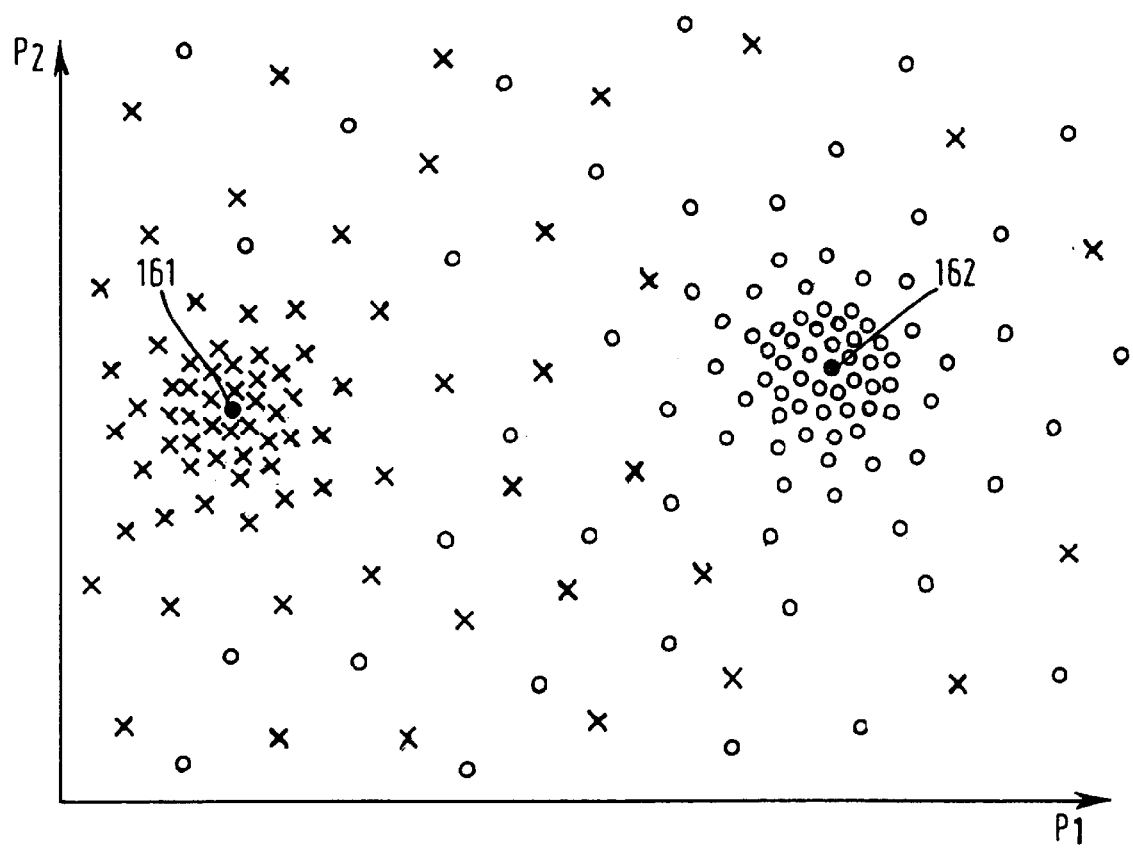
FIG. 25 illustrates a two dimensional collection of training vectors in acoustic context $C_k$ for which the lips are round and non round.

The probability of receiving such a vector X assuming that it was articulated with the lips being round and given that the vector X is in acoustic context $C_k$, i.e. $P(X/l=r;S \in C_k)$, will obviously be dependent upon the value of X. To illustrate this, FIG. 25 shows a plot of two dimensional training vectors having dimensions $P_1$ and $P_2$. The crosses in FIG. 25 illustrate all the training vectors in acoustic context $C_k$ for which the lips are round, and the circles illustrate all the training vectors in acoustic context $C_k$ for which the lips are non-round. If the received vector X is point 161 in FIG. 25, then $P(X/l=r;S \in C_k)$ should be high since point 161 corresponds well with training vectors from the third training session that are in acoustic context $C_k$ for which the lips are round. Further, $P(X/l=nr;S \in C_k)$ should be low since point 161 does not correspond well with training vectors from the third training session that are in acoustic context $C_k$ for which the lips are non-round. Conversely, if vector X is point 162 in FIG. 25, then $P(X/l=r;S \in C_k)$ should be low and $P(X/l=nr;S \in C_k)$ should be high.

Therefore, $P(X/l=r;S \in C_k)$ depends on the value of X and also on the distribution of training vectors in acoustic context $C_k$ for which the lips are round. Therefore, it is possible to build a model that will estimate the value of $P(X/l=r;S \in C_k)$ by modelling the distribution of corresponding training vectors, i.e. a model of the distribution of training vectors that are in acoustic context $C_k$ for which the lips are round. An estimate of $P(X/l=r;S \in C_k)$ can then be simply found by comparing the value of the currently observed vector X with the corresponding model.

There are a number of modelling techniques known in the art of speech analysis, though in the present embodiment a multi dimensional Gaussian mixture is used. The number of dimensions required will correspond to the number of coefficients in each vector produced by preprocessor 41.

Figure 26:
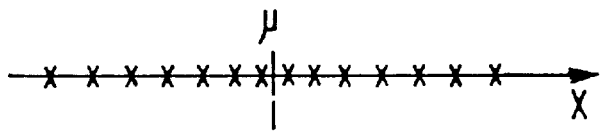
FIG. 26 shows a distribution of one dimensional vectors lying on a line.
Figure 27:
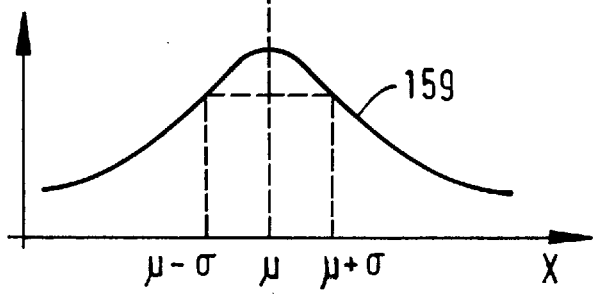
FIG. 27 shows a one dimensional Gaussian density function that models the distribution of vectors shown in FIG. 26.

The structure of a multi dimensional Gaussian mixture will now be explained with reference to FIGS. 26 to 30. FIG. 26 shows a distribution of one dimensional vectors lying on a line. Starting at the left most edge, and moving to the right, the vectors become closer to one another until point $\mu$, where they start spreading out again. FIG. 27 shows a one dimensional Gaussian density function 159 that models the distribution of vectors shown in FIG. 26. Starting at the left most edge, the vectors are relatively well spaced apart, resulting in a low value of the Gaussian density function. However, on moving to the right, the vectors become closer together resulting in the value of the Gaussian density function to increase to a maximum at point $\mu$. Continuing past point $\mu$, the value of the Gaussian density function again starts to reduce. The equation that represents this density function is given by:

$$G(\mu, \sigma^2) = \frac{1}{\sqrt{2\pi\sigma^2}} \exp[-(x-\mu)^2/2\sigma^2] \quad (20)$$

To completely specify this Gaussian density function, all that is required is the mean $\mu$ and variance $\sigma^2$.

Figure 28:
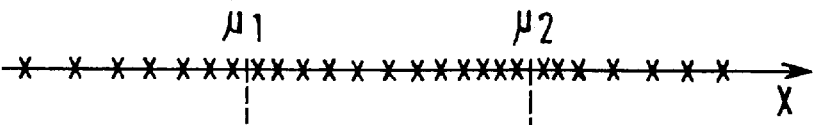
FIG. 28 shows another distribution of one dimensional vectors lying on a line.
Figure 29:
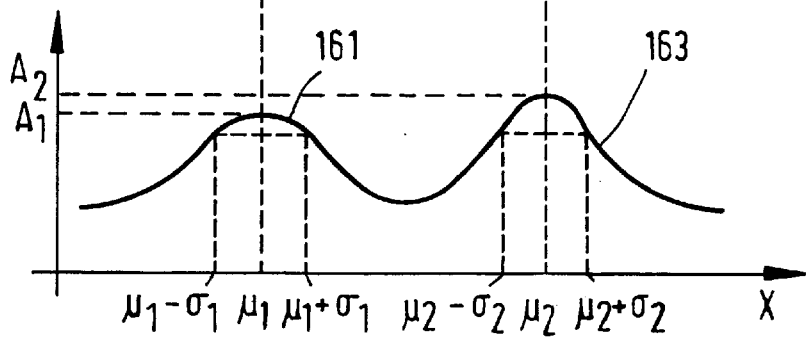
FIG. 29 shows two one dimensional Gaussian density functions that model the distribution of vectors shown in FIG. 28.

FIG. 28 shows another distribution of one dimensional vectors lying on a line. In this distribution, there are two distributions similar to the one shown in FIG. 26 concatenated one after the other. Although, in the second group of vectors, the spacing gets smaller at $\mu_2$ compared to the spacing at $\mu_1$. FIG. 29 shows a corresponding Gaussian "mixture" that models the distribution of vectors shown in FIG. 28. As a result of the different minimum spacing Gaussian 163 has a higher maximum value $A_2$ compared to the maximum value $A_1$ of Gaussian 161. To completely specify this distribution, the mean and variance $(\mu, \sigma^2)$ and the relative weights of each Gaussian are required.

Figure 30:
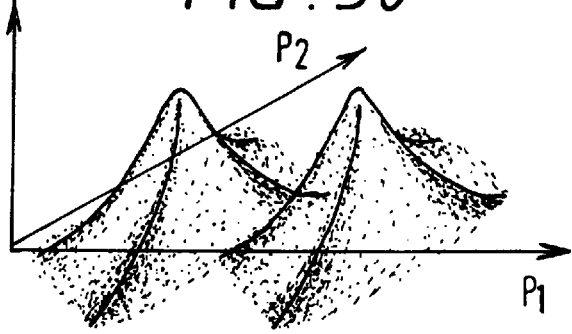
FIG. 30 shows two two dimensional Gaussian density functions.

Extending this idea to two dimensional vectors, FIG. 30 shows a two dimensional Gaussian mixture. In order to completely specify this distribution the mean, variance and covariance between the dimensions and the relative weights of each two dimensional Gaussian density function are needed. Extending this further, a multi dimensional Gaussian mixture is given by the following equation:

$$\text{Gaussian Mixture} = \sum_{i=1}^{m} N_i G(\mu, C) \quad (21)$$

$$G(\mu, C) = \frac{1}{(2\pi)^{n/2}|C|^{1/2}} \exp[-1/2(X-\mu)^T C^{-1}(X-\mu)]$$

$$C = \begin{bmatrix} \text{Var}(d_1) & \text{Cov}(d_1, d_2) & \ldots & \text{Cov}(d_1, d_n) \\ \text{Cov}(d_2, d_1) & \text{Var}(d_2) & \ldots & \text{Cov}(d_2, d_n) \\ \vdots & & \ddots & \vdots \\ \text{Cov}(d_n, d_1) & \text{Cov}(d_n, d_2) & \ldots & \text{Var}(d_n) \end{bmatrix}$$

where C is the covariance matrix and $\mu$ is the mean vector of the multi dimensional Gaussian density function, n is the number of dimensions in each vector, m is the number of multi dimensional Gaussian density functions in each mixture and $N_i$ are normalised weighing coefficients.

However, in the present embodiment in order to reduce the amount of data that needs to be stored, a single 13 dimensional Gaussian density function is used to model the distribution of training vectors associated with each feature value in each acoustic context.

Therefore, for the feature of the lips being round in acoustic context $C_k$, the covariance matrix C and mean $\mu$ of the multi dimensional Gaussian density function that "best matches" the distribution of training vectors in acoustic context $C_k$ for which the lips are round is determined. This is achieved, in a standard manner well known in the art of speech processing and need not be explained further. In the present embodiment, the models of each feature value in each acoustic context are calculated independently. However, it will be apparent to those skilled in the art that the models for each value of the same feature in the same acoustic context, for example for acoustic context $C_6$ the model for the lips being round and the model for the lips being non-round, could be determined together to increase discrimination between the feature values when the system is in operation.

Although the operation of feature estimator 47 has been described for the specific feature value of the lips being round, the same probabilities for all feature values of interest are estimated by feature estimator 47 in a similar manner, and passed on to decision block 49.

Decision Block

In the general case, the feature estimator 47 estimates the probability of receiving such a vector X assuming that feature i has value J. However, what is really required is the probability that feature i has value J given that vector X was received, i.e. $P(f_i=J/X)$.

From the description of FIG. 22 above, the probability of event A and event B occurring together, i.e. area 135, is given by equation (14).

By a similar analysis, the probability of event A and event B occurring together is also given by:

$$P(A;B)=P(B/A)P(A) \quad (22)$$

Therefore, $P(X;l=r)=P(X/l=r) P(l=r)$ which also equals $P(l=r/X) P(X)$, and so the probability that the lips are round given that vector X was received is given by:

$$P(l=r/X) = \frac{P(X/l=r)P(l=r)}{P(X)} \quad (23)$$

However, in the present application, decision block 49 only has to decide, for the currently observed vector X, whether the lips are or are not round, which is determined by calculating the maximum of the corresponding probabilities given in equation (23). In the general case, for feature i having value J, decision block 49 calculates:

$$\text{Max}_J\{P(f_i = J/X)\} = \text{Max}_J\{P(X/f_i = J)P(f_i = J)\} \quad (24)$$

The probability that feature i has value J, i.e. $P(f_i=J)$ is dependent upon the position of the articulators for previous frames. For example, if in the last frame the horizontal position of the tongue is at the front of the mouth, then it is unlikely in the next frame, 10 milliseconds later, it will be at the back of the mouth. Therefore, it is possible to include means within the decision block 49 to alter the decision step by altering $P(f_i=J)$ to take into account physical constraints and knowledge about the dynamics of the vocal apparatus. However, in the present embodiment, no knowledge of the past articulatory features is assumed and the probability of a feature having one value is assumed to equal the probability of the same feature having another value. Therefore, the term $P(f_i=J)$ does not contribute anything in the decision and so the values of the articulatory features are determined from the corresponding maximum probabilities generated by feature estimator 47.

At the output of decision making block 49, the value of each articulatory feature, for each vector, has been estimated. This information may be used to generate a graphical image of the moving articulators on display 53, or may be stored in a storage unit (not shown) for subsequent analysis. The graphical display 53, may be used by a clinician to detect speech disorders, or alternatively, the data generated for each frame may be compared by a clinician to corresponding data from a "normal" speaker. A further alternative is for a computer to be used to compare and to detect differences between the data generated from the speaker with the speech defect and the data generated from the normal speaker.

Second Embodiment

Figure 31:
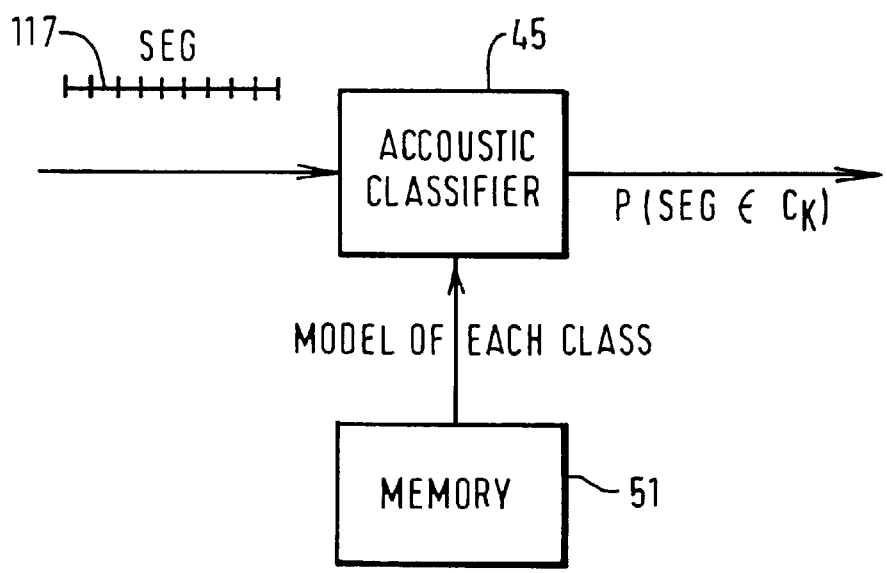
FIG. 31 diagrammatically illustrates the operation of the acoustic classifier in the second embodiment.
Figure 32:
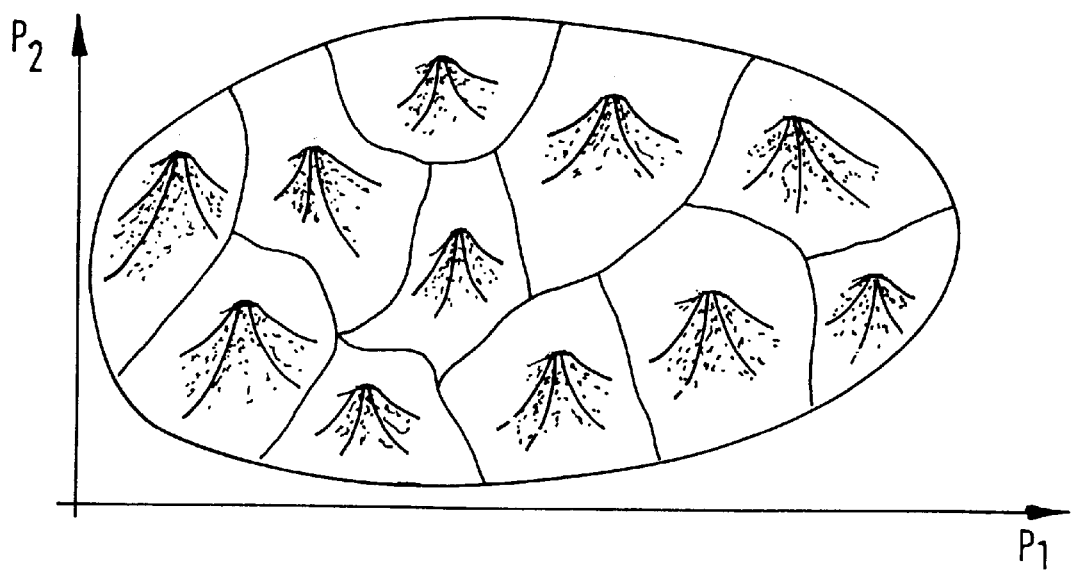
FIG. 32 shows an example of the Gaussian models used to model each class in the pool of vectors shown in FIG. 20.

A second embodiment of the present invention will now be described with reference to FIGS. 31 and 32.

The second embodiment differs from the first embodiment in that acoustic classifier 45 does not make a hard decision as to which class each segment belongs.

In this embodiment, preprocessor 41, buffer 42 and segmenter 43 are as in the first embodiment and thus will not be described again. FIG. 31 shows schematically the function of acoustic classifier 45 in the second embodiment. Once segmenter 43 has identified a segment 117 acoustic classifier 45 estimates the probability that segment 117 belongs to each acoustic class. The different acoustic classes are determined in the same manner as in the first embodiment and will not be described again.

In this embodiment, however, to increase accuracy, a multi dimensional Gaussian density function is used to model the distribution of training vectors in each class found. The multi dimensional Gaussian density function used to model each class is determined using standard methods for identifying the covariance matrix C and mean $\mu$ that best match the distribution of segment averages within each class. For example, FIG. 32 graphically shows the resulting two dimensional Gaussian models that best match the distribution of two dimensional segment averages in each class shown in FIG. 20.

Therefore, when in operation, once segmenter 43 has identified a segment acoustic classifier 45 estimates, for each class k, the probability $P(S \epsilon C_k)$ that the current segment belongs to that class. This is achieved by inserting the average vector of the current segment $\overline{X}_{seg}$ into the model for each class. These probabilities are then used in the feature estimator 47 to estimate, for each vector X in the current segment, the probability of receiving such a vector X assuming that a feature had a specific value, for all features and feature values of interest, i.e. $P(X/f_i=J)$, which is determined from the corresponding general form of equation (18). The method of training the feature estimator 47 to determine a model that estimates $P(X/f_i=J;S \epsilon C_k)$ and to determine the prior probabilities $P(f_i=J/S \epsilon C_k)$ for each acoustic class k, and $P(f_i=J)$ is the same as in the first embodiment and will not be described again. Note, that because acoustic classifier 45 determines $P(S \epsilon C_k)$ for each acoustic class k, the computational requirements of feature estimator 47 increases since no simplification of equation (18) can be made. The subsequent analysis performed on the information generated by the feature estimator 47 is the same as in the first embodiment and will not be described again.

Further Embodiments

In an alternative embodiment, in the training of acoustic classifier 45, rather than using a model that models the distribution of vectors in each class found, a class template could be determined for each class found, i.e. a segment representative of each class could be determined from the training data. Each class template would then be stored in memory 51 and used to generate a hard decision for the segment classification, as in the first embodiment, or alternatively, they could be used to generate the probability that the segment belongs to a class for each acoustic class, as in the second embodiment. With this technique, however, time alignment would be required since the segments found in the input speech signal by segmenter 43 are of variable duration. One method of time alignment is by using a dynamic programming method well known in the art of speech processing, and will not be described further.

Although in the above embodiments, the values of the features of interest have been estimated for each vector within each segment, an alternative embodiment may be provided that estimates the values of the features of interest once per segment using, for example, the average vector for the segment, thereby reducing computational requirements. Furthermore, since the maximum duration of a segment is 0.2 seconds, the classification of the current segment can be made dependent upon the classification of previous segments. Accordingly, acoustic classifier 45 may be arranged to take into account the classification of past segments when determining the classification of the current segment.

Although in the first embodiment, a hard decision is made in acoustic classifier 45 by comparing the average vector of each class with the average vector of the segment, such a comparison could be used to determine the probability that the segment belongs to each class, as in the second embodiment.

Furthermore, although in all of the above embodiments, segmenter 43, classifier 45 and feature estimator 47 have been designed to be incremental, i.e. to output a result as soon as the input is received with minimum delay, the present invention could be utilised in an apparatus that takes in a whole speech utterance and then performs the segmentation, classification and feature estimation in a manner that is not incremental, i.e. buffer 42 could be arranged to store a whole speech utterance corresponding to several seconds worth of speech; segmenter 43 could then segment the whole speech utterance into segments during which the acoustic properties of interest of the input speech signal are similar using, for example, the segmentation method described above, or using a more optimal segmentation method such as a dynamic programming method well known to those in the art of speech analysis; acoustic classifier 45 could then determine either the probabilities determined in the second embodiment or the hard decision determined in the first embodiment; and then feature estimator 47 could estimate the desired probabilities in a similar manner to that described above in the first and second embodiments.

Further, if incrementality is not essential, those skilled in the art of speech analysis will appreciate that segmentation and classification could be performed together using a dynamic programming method.

Although the components of the apparatus in the above embodiments work on a sequential machine, the present invention could be performed using parallel processing techniques. In such an embodiment, however, synchronisation between the components of the apparatus would be required, and buffer 42 would be required to store the vectors generated by preprocessor 41 while the outputs for a segment are being determined.

Language Capability

The inventor has established that by training the apparatus with English language speech samples from many different speakers, not only is the apparatus able to estimate the articulatory feature values from the speech of different speakers, it is also able to estimate the articulatory feature values, although with less accuracy, from speech of other languages. This is because everyone has the same articulators regardless of the language, and using an articulatory representation of speech gives a more intrinsic representation than, for example, a phonetic representation which is language dependent. It is possible to increase the accuracy of the system for other languages, by using speech samples from the other languages during the training sessions, and by incorporating phones particular to those languages in look up table 153.

Summary

To summarise, embodiments of an apparatus or method in accordance with the present invention determine, from an input speech signal, information representative of features of the speech production system that generated the input speech signal. The input speech signal is divided into frames, and for each frame the articulation information is estimated from training data. To do this, however, it is necessary to have acoustic context information for the frame, i.e. to have knowledge about neighbouring frames. This is achieved by finding acoustically uniform regions in the input speech signal and then acoustically characterising the regions via pre-discovered structure in training data.

It will be seen that an apparatus and method in accordance with the present invention alleviates some of the problems associated with the prior art methods of extracting articulatory information.

In particular, the present invention has the advantages that: (i) it works in real time; (ii) it is non-invasive and risk free; (iii) it does not impose physical restrictions on the subjects; and (iv) there is no need for intermediate interpretation by an expert.

Other Applications

Although the examples given above have illustrated that an articulatory description of speech is useful for diagnosing speech disorders, it will be apparent that this is not the only application for a method or apparatus in accordance with the invention. As an articulatory description of an input speech signal views speech as being a set of continuously evolving features, each of which varies independently and asynchronously with respect to other features, it is a more faithful description of speech than the alternative phonetic description. Furthermore, a relatively small set of features can account for all phones in all accents and all languages, and also for various non-speech events. Therefore, a method or apparatus in accordance with the invention will have particular use in speech recognition applications.

What I claim is:

1. An apparatus for determining, from an input speech signal, parameters defining the articulatory operation of a speech production system that generated the input speech signal, the apparatus comprising:

dividing means operable for dividing the input speech signal into a succession of frames;

a feature analyzer operable for determining acoustic features of the input speech signal during each frame;

a segmenter operable for defining a succession of segments as a number of frames by (i) comparing signals representative of the acoustic features for a current frame with signals representative of the acoustic features of previous frames in a current segment; (ii) including he current frame in the current segment if said signals differ by less than a threshold value; and (iii) beginning a new segment with the current frame if said signals differ by more than said threshold value; and determining means operable for determining, for each segment, said articulatory speech production parameters using the acoustic features of the input speech signal during the segment and using stored reference data which relates said acoustic features to said articulatory speech production parameters.

2. An apparatus according to claim 1, wherein said difference is determined using a weighted Euclidean distance measure.

3. An apparatus according to claim 1, wherein said segmenter comprises smoothing means arranged to generate smoothed signals representative of the acoustic features of each frame, by smoothing variations between the acoustic features of adjacent frames and wherein said segmenter is operable to perform said comparison using smoothed signals representative of the current frame and smoothed signals representative of the previous frames in the current segment.

4. An apparatus according to claim 1, wherein said segmenter is arranged to limit the number of frames allowed within each segment.

5. An apparatus according to claim 1, wherein said feature analyse is arranged to determine formant related information of the input speech signal during each frame.

6. An apparatus according to claim 1, wherein said reference data comprises information that groups a selection of segments of input speech into different acoustic classes representative of acoustic characteristics of speech signals, and wherein said apparatus comprises a classifier for determining classification information for each segment defined by said segmenter and wherein said determining means is arranged to determine said parameters using said classification information.

7. An apparatus according to claim 6, wherein said classifier is arranged to determine, for each class, the probability that the current segment belongs to that class and wherein said classification information comprises each said determined probability.

8. An apparatus according to claim 6, wherein said classification information comprises the most likely class to which the current segment belongs.

9. An apparatus according to claim 6, wherein said information that groups said selection of segments into different classes comprises a plurality of mathematical models, one for each acoustic class, each model modelling the distribution of the acoustic features of the input speech during the selected segments in the class.

10. An apparatus according to claim 9, wherein each said mathematical model is an average.

11. An apparatus according to claim 9 or 10, wherein said classifier is arranged to determine said classification information by comparing signals representative of the current segment with each said mathematical model.

12. An apparatus according to claim 11, wherein said signals representative of the current segment are the average of the acoustic features of the input speech signal during the current segment.

13. An apparatus according to claim 6, wherein each of said parameters has associated therewith a number of discrete parameter values and wherein said reference data comprises a mathematical model for each parameter value in each acoustic class, relating that parameter value to said acoustic features.

14. An apparatus according to claim 13, wherein said mathematical model for each parameter value in each acoustic class is a Gaussian density function.

15. An apparatus according to claim 13, wherein said reference data further comprises the probability that a specific parameter defining the operation of the speech production system has one of said associated discrete parameter values given that a segment is in a specific acoustic class, for each parameter and parameter value in each acoustic class.

16. An apparatus according to claim 15, wherein said reference data further comprises the probability that a specific parameter defining the operation of the speech production system has one of said associated discrete parameter values, for each parameter and each parameter value.

17. An apparatus according to claim 13, wherein said mathematical model for each parameter value in each acoustic class is arranged to estimate the probability of receiving an input speech signal corresponding to the current frame, given that the current frame is in a segment in the acoustic class for that model, and assuming that the parameter has the parameter value for that model.

18. An apparatus according to claim 1, wherein said determining means is arranged to determine said parameters for each frame of input speech.

19. An apparatus according to claim 17, wherein said determining means is arranged to determine the probability of receiving an input speech signal corresponding to the current frame assuming that a specific parameter defining the operation of the speech production system has one of said associated parameter values, for each parameter and parameter value in dependence upon said reference data.

20. An apparatus according to claim 1, wherein said determining means is arranged to determine said parameters once per segment, in dependence upon signals representative of the segment.

21. An apparatus according to claim 6, wherein said classifier is arranged to determine said classification information in dependence upon previously determined classification information.

22. An apparatus according to claim 1, wherein said segmenter is arranged to compare the signals representative of the acoustic features of previous frames in the current segment with the signals representative of the acoustic features for the current frame as soon as said feature analyser has determined the acoustic features for the current frame.

23. An apparatus according to claim 1, wherein said determining means is arranged to determine, for the current segment, said parameters as soon as the last frame in the segment has been divided from the input speech signal.

24. An apparatus according to claim 1, further comprising a buffer for storing acoustic features corresponding to a plurality of frames, and wherein said segmenter is arranged to define a plurality of segments within the stored acoustic features corresponding to said plurality of frames, after said acoustic features have been determined by said feature analyser.

25. An apparatus according to claim 24, wherein said determining means is arranged to determine, for each segment defined by said segmenter, said parameters as soon as each said segment is defined by said segmenter.

26. An apparatus according to claim 1, wherein said determining means is arranged to decide the value of each parameter, based on the probabilities determined for that parameter.

27. An apparatus according to claim 26, wherein said determining means is arranged to decide the value of each parameter in dependence upon past decisions about the parameter values.

28. A speech processing method comprising the steps of:
providing a set of training speech signals having known phonetic boundaries and/or known boundaries between segments in the training speech signals, acoustic features of the training speech signals being substantially the same in each segment;
dividing said training speech signals into a succession of frames;
determining, for each frame, acoustic features of the training speech signal during the frame;
defining a succession of segments within the training speech signals, and thus defining the location of trial boundaries between segments, by (i) comparing signals representative of the acoustic features for a current frame with signal representative of the acoustic features of previous frames in the current segment; (ii) including the current frame in the current segment if said signals differ by less than a threshold value; (iii) beginning a new segment with the current frame if said signals differ by more than said threshold value; and (iv) performing steps (i) to (iii) for a plurality of different threshold values;
comparing the trial boundaries between segments defined in said defining step of the different threshold values with the known boundaries of the training speech signals;
storing the threshold value which gives a good correlation between the known boundaries and the trial boundaries defined in said defining steps;
using the stored threshold value to segment subsequent input speech; and determining articulatory speech production parameters of the segmented speech.

29. A speech processing method comprising the steps of:
dividing a set of training speech signals representative of utterances from a plurality of different users into a succession of frames for each utterance;
determining acoustic features of the training speech signal during each frame;
defining a succession of segments within each utterance of training speech by (i) comparing signals representative of the acoustic features for a current frame with signals representative of the acoustic features of previous frames in a current segment; (ii) including the current frame in the current segment if said signals differ by less than a threshold value; and (iii) beginning a new segment with the current frame if said signals differ by more than said threshold value;
identifying boundaries between acoustic classes representative of acoustic characteristics identified in the set of training speech signals by using segments in all utterances of the training speech;
determining reference data modelling each acoustic class by using segments in all utterances of the training speech;
storing said reference data; and
using the stored reference data to determine articulatory speech production parameters of subsequently input speech.

30. A method according to claim 29, further comprising the steps of:
providing a second set of training speech signals including values of parameters defining the operation of the speech production system that generated the second set of training speech signals;

dividing the second set of training speech signals into a succession of frames;

determining acoustic features the training speech signal during each frame;

defining a succession of segments within the second set of training speech signals by (i) comparing signals representative of the acoustic features for a current frame with signals representative of the acoustic features of previous frames in a current segment; (ii) including the current frame in the current segment if said signals differ by less than a threshold value; and (iii) beginning a new segment with the current frame if said signals differ by more than said threshold value;

determining, from said reference data grouping segments in the first set of training speech signals into different acoustic classes, which acoustic class each segment defined in said second set of training speech signals most likely belongs to, by comparing signals representative of each segment defined in said second set of training speech signals with said reference data grouping the segments defined in said first set of training speech signals; and determining and storing, for each acoustic class found in said first set of training speech, reference data representative of a relationship between said values of parameters and said acoustic features, using the segments defined in the first set of training speech signals in the corresponding acoustic class.

31. A method according to claim 30, further comprising the step of determining from said acoustic features of each frame of training speech in said second set of training speech signals, the probability that a specific parameter has a specific parameter value, given that a segment defined in said second set of training speech signals is in a specific acoustic class, for each parameter and parameter value in each acoustic class.

32. A method according to claim 29, further comprising the step of determining from said values of parameters defining the operation of the speech production system that generated the first set of training speech signals, the probability that a specific parameter parameter of the speech production system has a specific parameter value, for each parameter and each parameter value.

33. A method according to claim 30, further comprising the step of determining from said values of parameters defining the operation of the speech production system that generated the first set of training speech signals, the probability that a specific parameter of the speech production system has a specific parameter value, for each parameter and each parameter value.

34. An apparatus according to claim 1, wherein said reference data representative of training speech signals is determined by a method in accordance with any one of claims 29 to 33.

35. A method of determining, from an input speech signal, parameters defining the articulatory operation of a speech production system that generated the input speech signal, the method comprising the steps of:

dividing the input speech signal into a succession of frames;

determining acoustic features of the input speech signal during each frame;

defining a succession of segments as a number of frames by (i) comparing signals representative of the acoustic features for a current frame with signals representative of the acoustic features of previous frames in a current segment; (ii) including the current frame in the current segment if said signals differ by less than a threshold value; and (iii) beginning a new segment with the current frame if said signals differ by more than said threshold value; and determining, for each segment, said articulatory speech production parameters using the acoustic features of the input speech signal during the segment and using stored reference data which relates said acoustic features to said articulatory speech production parameters.

36. A method according to claim 35, wherein said difference is determined using a weighted Euclidean distance measure.

37. A method according to claim 35, wherein said defining step comprises the step of generating smoothed signals representative of the acoustic features of each frame, by smoothing variations between the acoustic features of adjacent frames and wherein said defining step performs said comparison using smoothed signals representative of the current frame and smoothed signals representative of the previous frames in the current segment.

38. A method according to claim 35, wherein said defining step is operable to limit the number of frames allowed within each segment.

39. A method according to claim 35, wherein said step of determining acoustic features of the input speech signal during a frame comprises the step of determining formant related information of the input speech signal during each frame.

40. A method according to claim 35, wherein said reference data comprises information that groups a selection of segments of input speech into different acoustic classes representative of acoustic characteristics of speech signals, and wherein said method comprises the step of classifying each defined segment and wherein said step of determining parameters determines said parameters using said classification information.

41. A method according to claim 40, wherein said classifying step determines, for each class, the probability that the current segment belongs to that class.

42. A method according to claim 40, wherein said classifying step determines the most likely class to which the current segment belongs.

43. A method according to claim 40, wherein said information that groups said selection of segments into different classes comprises a plurality of mathematical models, one for each acoustic class, each model modelling the distribution of the acoustic features of the input speech during the selected segments in the class.

44. A method according to claim 43, wherein each said mathematical model is an average.

45. A method according to claim 43 or 44, wherein said classifying step compares signals representative of the current segment with each said mathematical model.

46. A method according to claim 45, wherein said signals representative of the current segment are the average of the acoustic features of the input speech signal during the current segment.

47. A method according to claim 40, wherein each of said parameters has associated therewith a number of discrete parameter values and wherein said reference data comprises a mathematical model for each parameter value in each acoustic class, relating that parameter value to said acoustic features.

48. A method according to claim 47, wherein said mathematical model for each parameter value in each acoustic class is a Gaussian density function.

49. A method according to claim 47, wherein said reference data further comprises the probability that a specific parameter defining the operation of the speech production system has one of said associated discrete parameter values given that a segment is in a specific acoustic class, for each parameter and parameter value in each acoustic class.

50. A method according to claim 49, wherein said reference data further comprises the probability that a specific parameter defining the operation of the speech production system has one of said associated discrete parameter values, for each parameter and each parameter value.

51. A method according to claim 47, wherein said mathematical model for each parameter value in each acoustic class is used to estimate the probability of receiving an input speech signal corresponding to the current frame, given that the current frame is in a segment in the acoustic class for that model, and assuming that the parameter has the parameter value for that model.

52. A method according to claim 35, wherein said step of determining said parameters operates for each frame of input speech.

53. A method according to claim 51, wherein said step of determining said parameters determines the probability of receiving an input speech signal corresponding to the current frame given that a specific parameter defining the operation of the speech production system has one of said associated parameter values, for each parameter and parameter value in dependence upon said reference data.

54. A method according to claim 35, wherein said step for determining said parameters operates once per segment, in dependence upon signals representative of the segment.

55. A method according to claim 39, wherein said classifying step classifies each segment in dependence upon the classification of previous segments.

56. A method according to claim 35, wherein said defining step compares the signals representative of the acoustic features of previous frames in the current segment with the signals representative of the acoustic features for the current frame as soon as the signals representative of the acoustic features for the current frame have been determined.

57. A method according to claim 35, wherein said step of determining said parameters operates as soon as the last frame in the segment has been determined by said defining step.

58. A method according to claim 35, comprising the step of buffering acoustic features corresponding to a plurality of frames, and wherein said defining step defines a plurality of segments within the stored acoustic features corresponding to said plurality of frames, after said acoustic features have been determined.

59. A method according to claim 58, wherein said step of determining said parameters operates as soon as each segment is defined.

60. A method according to claim 53, further comprising the step of deciding the value of each parameter, based on the probabilities determined for that parameter.

61. A method according to claim 60, wherein said decision step decides the value of each parameter in dependence upon past decisions of parameter values.

62. An apparatus according to claim 1, wherein said threshold value is determined using a method of determining a threshold value for use in segmenting an input speech signal, the method comprising the steps of:

providing a set of training speech signals having known phonetic boundaries and/or known boundaries between segments in the training speech signals, the acoustic features of the training speech signals being substantially the same in each segment;

dividing said training speech signals into a succession of frames;

determining, for each frame, acoustic features of the training speech signal during the frame;

defining a succession of segments within the training speech signals, and thus defining the location of trial boundaries between segments, by (i) comparing signals representative of the acoustic features for a current frame with signals representative of the acoustic features of previous frames in the current segment; (ii) including the current frame in the current segment if said signals differ by less than a threshold value; (iii) beginning a new segment with the current frame if said signals differ by more than said threshold value; and (iv) performing steps (i) to (iii) for a plurality of different threshold values;

comparing the trial boundaries between segments defined in said defining step for the different threshold values with the known boundaries of the training speech signals; and storing the threshold value which gives a desired good correlation between the known boundaries and the trial boundaries defined in said defining step.

* * * * *

UNITED STATES PATENT AND TRADEMARK OFFICE
CERTIFICATE OF CORRECTION

PATENT NO. : 5,913,188
DATED : June 15, 1999
INVENTOR(S) : Eli Tzirkel-Hancock et al.

It is certified that error appears in the above-identified patent and that said Letters Patent is hereby corrected as shown below:

Title page,
[54], In the Title:
"ORPERATION" should read -- OPERATION --.

Column 1:
Line 3, "ORPERATION" should read -- OPERATION --.
Line 48, "individuals" should read -- individual's --.

Column 4:
Line 1, "comprising" should read -- comprising: --.
Line 7, "signal;" should read -- signal; and --.
Line 12, "comprising" should read -- comprising: --.
Line 17, "signal;" should read -- signal; and --.

Column 6:
Line 58, "Sound" should read -- Sounds --.

Column 8:
Line 24, "address" should read -- addresses --.
Line 32, "value" should read -- values --.
Line 67, "signal" should read -- signals --.

Column 9:
Line 29, "detail" should read -- details --.

Column 12:
Line 60, "over written" should read -- overwritten --.

Column 13:
Line 14, "vertical-lines" should read -- vertical lines --.

Column 23:
Line 39, "alleviates" should read -- alleviate --.

Column 24:
Line 8, "he" should read -- the --.
Line 34, "analyse" should read -- analyser --.

UNITED STATES PATENT AND TRADEMARK OFFICE
CERTIFICATE OF CORRECTION

PATENT NO. : 5,913,188
DATED : June 15, 1999
INVENTOR(S) : Eli Tzirkel-Hancock et al.

It is certified that error appears in the above-identified patent and that said Letters Patent is hereby corrected as shown below:

Column 26:
Line 35, "and determining" should read -- and ¶ determining --.

Column 27:
Line 43, "parameter parameter" should read -- parameter --.

Signed and Sealed this

Twenty-fifth Day of September, 2001

Attest:

NICHOLAS P. GODICI
Attesting Officer    Acting Director of the United States Patent and Trademark Office